US007003151B2

(12) United States Patent
Shimada

(10) Patent No.: US 7,003,151 B2
(45) Date of Patent: Feb. 21, 2006

(54) IMAGE PROCESSING APPARATUS AND CONTROL METHOD THEREFOR

(75) Inventor: Takuya Shimada, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 700 days.

(21) Appl. No.: 09/906,644

(22) Filed: Jul. 18, 2001

(65) Prior Publication Data

US 2002/0039106 A1  Apr. 4, 2002

(30) Foreign Application Priority Data

| Jul. 19, 2000 | (JP) | ............................. 2000-219567 |
| Jul. 19, 2000 | (JP) | ............................. 2000-219568 |
| Jul. 13, 2001 | (JP) | ............................. 2001-214193 |

(51) Int. Cl.
   *G06K 9/00* (2006.01)
(52) U.S. Cl. ...................... 382/162; 382/167; 345/590; 358/518
(58) Field of Classification Search ................ 382/162, 382/167; 345/589–591, 604; 348/649, 650; 358/518–523
   See application file for complete search history.

(56) References Cited

U.S. PATENT DOCUMENTS

| 4,710,785 | A | | 12/1987 | Mills ........................ 346/153.1 |
| 5,416,613 | A | * | 5/1995 | Rolleston et al. ........... 358/518 |
| 5,856,876 | A | | 1/1999 | Sasanuma et al. .......... 358/300 |
| 5,881,209 | A | | 3/1999 | Stokes ........................ 395/109 |
| 5,978,107 | A | * | 11/1999 | Murai et al. ................. 358/520 |
| 6,081,254 | A | | 6/2000 | Tanaka et al. .............. 345/154 |
| 6,345,117 | B1 | * | 2/2002 | Klassen ...................... 382/167 |
| 6,459,425 | B1 | * | 10/2002 | Holub et al. ................ 345/207 |
| 6,473,197 | B1 | * | 10/2002 | Shimazaki .................. 358/1.9 |
| 6,525,721 | B1 | * | 2/2003 | Thomas et al. ............. 345/594 |
| 6,650,771 | B1 | * | 11/2003 | Walker ....................... 382/162 |
| 6,697,660 | B1 | * | 2/2004 | Robinson .................... 600/409 |
| 6,809,837 | B1 | * | 10/2004 | Mestha et al. .............. 358/1.9 |
| 2002/0122589 | A1 | * | 9/2002 | Reiman et al. ............. 382/167 |

FOREIGN PATENT DOCUMENTS

| EP | 0 741 491 | 11/1996 |
| EP | 0 891 078 | 1/1999 |
| JP | 08-289149 | 11/1996 |

OTHER PUBLICATIONS

Giorgianni et al. (Digital Color Management, 1998, pp. 420-421).*

* cited by examiner

*Primary Examiner*—Bhavesh M. Mehta
*Assistant Examiner*—Yubin Hung
(74) *Attorney, Agent, or Firm*—Fitzpatrick, Cella, Harper & Scinto

(57) ABSTRACT

If the color reproduction characteristics in a device vary at the time of creation of a profile and at the time of execution of a CMS (color management system) using the profile, a good color reproduction result cannot be obtained as a result of the execution of the CMS. In this invention, therefore, a current characteristic representing the current color reproduction characteristic of the device is acquired, and an estimated characteristic indicating a color reproduction characteristic based on a device profile is acquired. The degree of stability of the current color reproduction characteristic of the device is acquired. Whether the profile properly reflects the current characteristics is determined on the basis of the current characteristic, the estimated characteristic, and the degree of stability. By updating the profile on the basis of the this determination result, optimal color reproduction characteristics are maintained in the device.

29 Claims, 31 Drawing Sheets

FIG. 25

PROFILE PRECISION

| COLOR NAME | ESTIMATION ERROR | VARIATION |
|---|---|---|
| SKIN COLOR | ××× | ××× |
| AZURE | ××× | ××× |
| VERDURE | ××× | ××× |

IMAGE PROCESSING APPARATUS AND CONTROL METHOD THEREFOR

FIELD OF THE INVENTION

The present invention relates to an image processing apparatus and its control method which properly reproduce the same image data in a plurality of image input/output apparatuses.

BACKGROUND OF THE INVENTION

As an image processing technique of properly reproducing the same color image in a plurality of image input/output apparatuses, a CMS (Color Management System) is known.

A CMS will be described by exemplifying the case where a plurality of apparatuses such as a color printer, color monitor, and color copying machine are connected to each other, as shown in FIG. 31.

According to the CMS, a color signal in an input system is transformed into a color signal in an output system. More specifically, an input color signal is transformed into a signal in a color space independent of an apparatus (to be referred to as a device-independent color space hereinafter) by using a predetermined transformation formula or table associated with an input apparatus. The predetermined transformation formula or table used to transform a signal in a color space dependent on an apparatus into a signal in a device-independent color space will be referred to as a profile for the apparatus.

After a signal value to be output is obtained by performing predetermined color processing for the transformed signal in the device-independent color space, the signal value is transformed into a signal in a color space dependent on each output apparatus by referring to a profile for each output apparatus.

As described above, according to the CMS, color matching between a plurality of apparatuses can be realized by transforming a color signal in a color space dependent on each apparatus into a color signal in a device-independent color space on the basis of the profile for each apparatus.

In general, as a device-independent color space, the CIE/XYZ color space, CIE/L*a*b* color space, or the like which is a color space used for colorimetry of an image output from an output apparatus is used.

A profile for each apparatus is created on the basis of the relationship between each color signal value and the value obtained by actual colorimetry of a visible image input to the apparatus or output therefrom. For example, a profile for an input apparatus is created by using a sample image as an original which is based on a predetermined color signal on the basis of an input image signal obtained through the apparatus. A profile for an output apparatus is created by outputting a sample image based on a predetermined color signal in the apparatus and calorimetrically measuring the output sample image.

However, the color reproduction characteristic of an image input/output apparatus does not necessarily remain the same at the time of creating of a profile and at the time of execution of a CMS using the profile. This phenomenon occurs when the color reproduction characteristic of an image output apparatus varies more or less due to differences between parts such as color material lots in the apparatuses, environmental differences such as temperature/humidity differences, changes in the quality of image forming components and the like over time, or the like. When the color reproduction characteristic changes after the creation of a profile, the relationship between each color signal and the corresponding calorimetric value of an output image, which is reflected in the profile, changes. Obviously, therefore, when the CMS is executed without any change, a proper color reproduction result cannot be obtained.

If, therefore, the color reproduction characteristic of an image input/output apparatus greatly changes, the profile must be updated. The conventional CMS, however, provides no means for allowing a user or person who maintains a profile (to be referred to as a profile manager hereinafter) to check a change in the color reproduction characteristic of an image input/output apparatus and determine the validity of the profile. For this reason, profile update processing is not always performed at a proper timing.

SUMMARY OF THE INVENTION

The present invention has been proposed to solve the conventional problems, and has as its object to provide an image processing apparatus and its control method, which can perform stable color processing regardless of variations in color reproduction characteristic in an image input/output apparatus.

According to the present invention, the foregoing object is attained by providing a method of controlling an image processing apparatus for performing color transformation based on color transformation information unique to a connected device, comprising: a first acquisition step of acquiring a current characteristic representing a current color reproduction characteristic of the device; a second acquisition step of acquiring an estimated characteristic representing a color reproduction characteristic based on the color transformation information of the device; a third acquisition step of acquiring a degree of stability of a color reproduction characteristic in the device; and a determination step of determining, on the basis of the current characteristic, the estimated characteristic, and the degree of stability, whether the color transformation information properly reflects the current characteristic or a method of controlling an image processing apparatus for performing color transformation based on color transformation information unique to a connected device, comprising: a first acquisition step of acquiring a current characteristic representing a current color reproduction characteristic of the device; a second acquisition step of acquiring an estimated characteristic representing a color reproduction characteristic based on the color transformation information of the device; and a evaluation step of evaluating a degree of reflection of the current characteristic in the color transformation information on the basis of the current characteristic and the estimated characteristic.

In accordance with the present invention as described above, by evaluating whether the color transformation information held in a device is proper, stable color processing can be performed in the device.

According to the present invention, the foregoing object is attained by providing a method of controlling an image processing apparatus for performing color transformation based on color transformation information unique to a connected device, comprising: a stability degree acquisition step of acquiring a degree of stability of a color reproduction characteristic in the device; a representative value acquisition step of acquiring a representative value of color reproduction in the device on the basis of the degree of stability; and a color transformation information generation step of generating color transformation information unique to the device on the basis of the representative value.

In accordance with the present invention as described above, since color transformation information can be generated in consideration of the degree of stability of color reproduction in a device, proper color reproduction can be performed in the device.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 25 is a view showing an example of how profile estimation precisions are output in the eighth embodiment;

FIG. 28 is a view showing an example of a color patch image in the ninth embodiment;

DETAILED DESCRIPTION OF THE PREFERRED EMBODIMENTS

Preferred embodiments of the present invention will now be described in detail in accordance with the accompanying drawings.

<First Embodiment>

Figure 1:
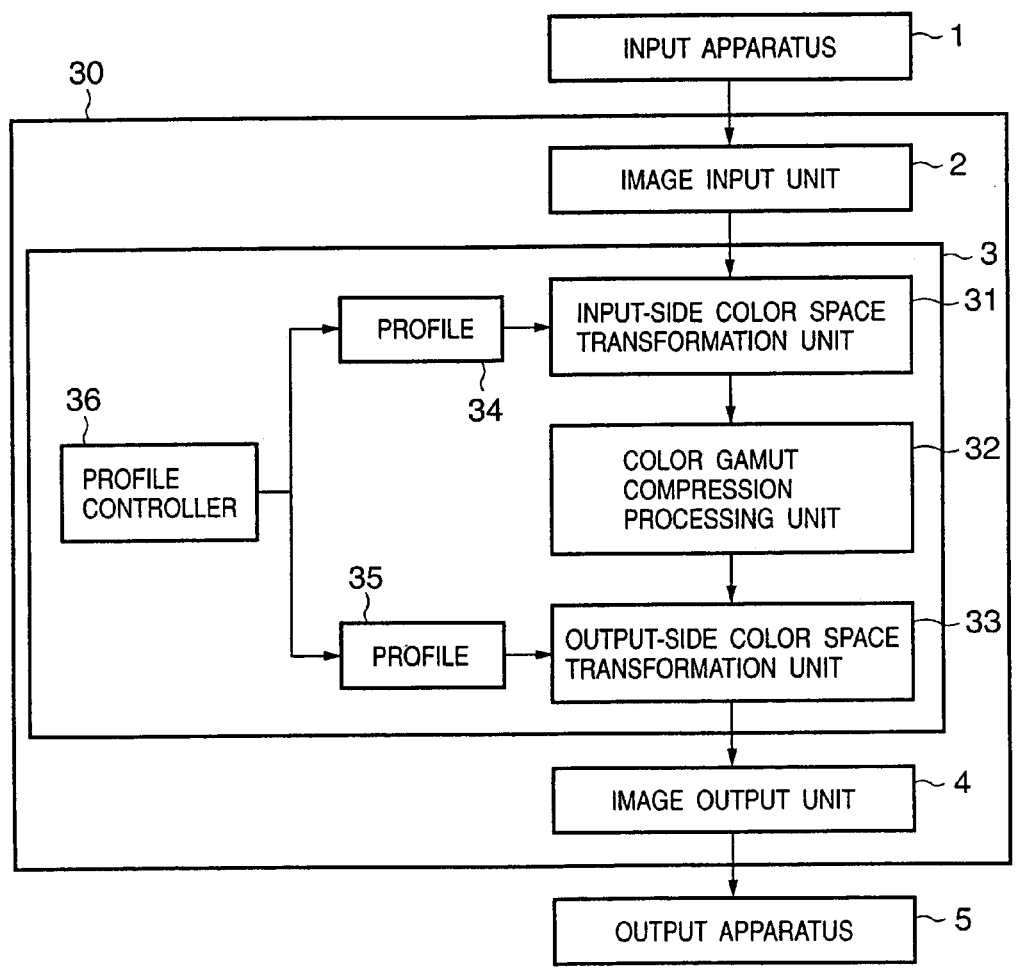
FIG. 1 is a block diagram showing the schematic arrangement of an image processing system in which a CMS is executed in an embodiment of the present invention.

FIG. 1 is a view showing the schematic arrangement of an image processing system for executing a CMS according to this embodiment. As shown in FIG. 1, the image processing system according to this embodiment is comprised of an input apparatus 1, image processing apparatus 30, and output apparatus 5. The image processing apparatus 30 includes an image input unit 2, image processing unit 3, and image output unit 4. The color image data input from the input apparatus 1 to the image processing apparatus 30 through the image input unit 2 is transformed into data in a device-independent color space that does not depend on any devices in the image processing unit 3. After predetermined color gamut compression processing is performed for the data, the resultant data is output to the output apparatus 5 through the image output unit 4. Note that the output apparatus 5 is an apparatus for visualizing an image, and typified by a display for displaying an image, a printer for forming an image on a recording medium, and the like. The input apparatus 1 is an apparatus for generating image data, and typified by a scanner for reading an image on a recording medium and the like as well as an image sensing apparatus and computer. The device-independent color space is, for example, the CIE/L*a*b* color space used for colorimetry.

The image processing unit 3 also includes an input-side color space transformation unit 31, color gamut compression processing unit 32, output-side color space transformation unit 33, profiles 34 and 35, and profile controller 36.

The input-side color space transformation unit 31 transforms the color image data input from the input apparatus 1 through the image input unit 2, i.e., the color image data in the color space dependent on the color reproduction range of the input apparatus 1, into data in the device-independent color space on the basis of the profile 34.

The color gamut compression processing unit 32 performs color gamut compression processing for the color image data in the device-independent color space supplied through the input-side color space transformation unit 31 to transform the data into data in a color gamut in which the output apparatus 5 can reproduce the data.

The output-side color space transformation unit 33 transforms on the basis of the profile 35 the color image data in the device-independent color space, which has undergone the color gamut compression processing by the color gamut compression processing unit 32, into color image data in the color space dependent on the color reproduction range of the output apparatus 5, and then outputs the resultant data to the output apparatus 5 through the image output unit 4.

To allow the input-side color space transformation unit 31 and output-side color space transformation unit 33 to perform transformation (CMS) between the color spaces dependent on the color reproduction ranges of the input apparatus 1 and output apparatus 5 and the device-independent color space, predetermined transformation formulae or tables are retained as the profiles 34 and 35 in advance for the respective apparatuses.

In this embodiment, the profile controller 36 controls the profiles 34 and 35 to always keep them in an optimum state.

In general, if an apparatus exhibits great variations in color reproduction characteristic, and the difference in calorimetric value between an output image at the time of creation of a profile and an output image after the use of the profile is not statistically significant, it can be determined that the difference is attributed to the variations. If the variations are small and the above difference is significant, better color reproduction can be expected by updating the profile.

Assume that in an existing profile, even though the coordinates, in the device-independent color space ($L^*$, $a^*$, $b^*$), which corresponds to an RGB color signal (100, 100, 100) in the apparatus are (50, 0, 0), calorimetric values of an image based on the RGB color signal output from the image output apparatus exhibit almost no variation, e.g., (42, 0, 0), (42.1, 0, 0), and (41.9, 0, 0), and the image data is reproduced with an average (42, 0, 0). In this case, the profile precision can be improved by creating a new profile with a calorimetric value (42, 0, 0) corresponding to the color signal (100, 100, 100).

In this embodiment, a profile is properly updated to reflect the current color reproduction characteristic in an output apparatus on the basis of the calorimetric value estimated by the profile, an average calorimetric value in the current output image in the image output apparatus, and variations in calorimetric value.

In this embodiment, when an existing profile is to be updated, it must be checked whether the profile reflects the current color reproduction characteristic in the apparatus. In this case, that the existing profile matches the current color reproduction characteristic indicates that the calorimetric value distribution in an output image from the image output apparatus at the time of creation of a profile has the same average value as the current average value. In this embodiment, therefore, whether these two distributions have the same average value is tested by using a t-statistic. In many cases, since a calorimetric value at the time of creation of a profile is not retained in the apparatus, values based on the current calorimetric value are substituted for a sample variance and sampling count.

A method of updating a profile according to this embodiment will be described in detail below. Assume that in this case, the profile 35 associated with the output apparatus 5 is updated.

Figure 2:
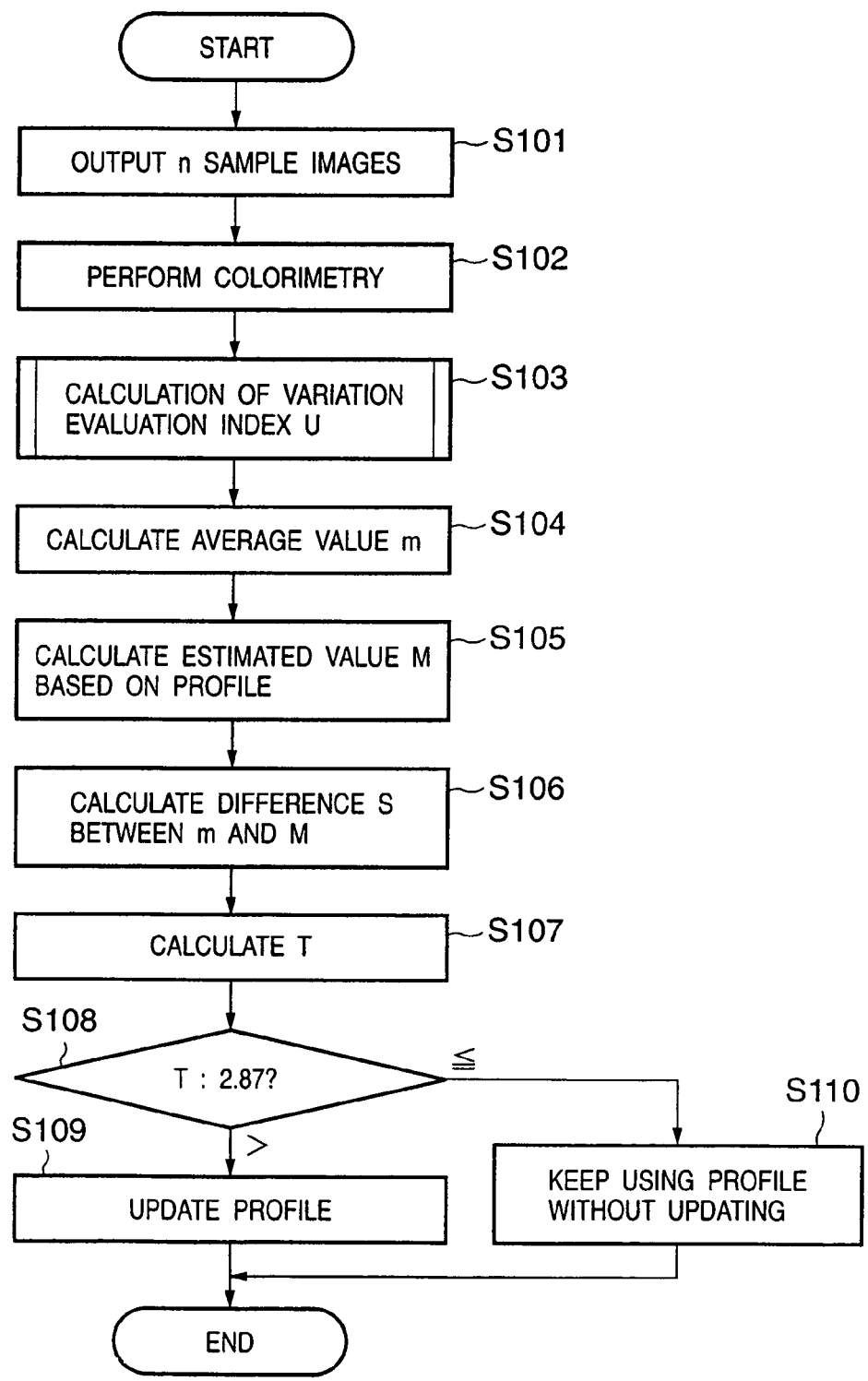
FIG. 2 is a flow chart showing profile update processing in this embodiment.

FIG. 2 is a flow chart showing a procedure for updating the profile 35 for a CMS in this embodiment.

First of all, a proper sampling count n is determined in advance to check the current color reproduction characteristic in the output apparatus 5, and n color signals are output to check the color reproduction characteristic (step S101). The output image is measured calorimetrically (step S102), and a color variation evaluation index U is calculated on the basis of each calorimetric value $m_i$: ($m_i = (L^*_i, a^*_i, b^*_i)$, i=1, 2, . . . , n) according to a procedure to the described later (step S103).

As indicated by equations (1), an average value m: (($L^*_{ave}$, $a^*_{ave}$, $b^*_{ave}$) of each calorimetric value $m_i$ is calculated as an average along each axis in the device-independent color space (step S104). This average value m represents the sample average of the current color reproduction characteristic in the output apparatus 5.

$$\left. \begin{array}{l} L^*_{ave} = \dfrac{\sum_{i}^{n} L^*_i}{n} \\[6pt] a^*_{ave} = \dfrac{\sum_{i}^{n} a^*_i}{n} \\[6pt] b^*_{ave} = \dfrac{\sum_{i}^{n} b^*_i}{n} \\[6pt] m = (L^*_{ave}, a^*_{ave}, b^*_{ave}) \end{array} \right\} \quad (1)$$

A null hypothesis that the "difference between the calorimetric value estimated by an existing profile and the current sample average m is coincidentally produced in samples extracted from a population having the same average" is tested.

A calorimetric value (estimated value) M corresponding to the above color signal is obtained by using the existing profile 35 (step S105). A difference S between the estimated value M and the current sample average value m is calculated by using the CIE1994 color difference formula represented by equation (2) according to equation (3) (step S106)

$$\Delta E_{1994}(col1, col2) = \sqrt{(\Delta L^*)^2 + (\Delta C^*/(1+0.045C^*))^2 + (\Delta H^*/(1+0.015C^*))^2} \quad (2)$$

for $col1: (L^*_1, a^*_1, b^*_1)$ $col2: (L^*_2, a^*_2, b^*_2)$ $\Delta L^* = L^*_1 - L^*_2$ $C^*_1 = \sqrt{(a^*_1)^2 + (b^*_1)^2}$ $C^*_2 = \sqrt{(a^*_2)^2 + (b^*_2)^2}$ $C^* = \left| \dfrac{C^*_1 - C^*_2}{2} \right|$ $\Delta C^* = C^*_1 - C^*_2$ $\Delta E = \sqrt{(\Delta L^*)^2 + (a^*_1 - a^*_2)^2 + (b^*_1 - b^*_2)^2}$ $\Delta H^* = \sqrt{(\Delta E^*)^2 - (\Delta L^*)^2 - (\Delta C^*)^2}$ $S = \Delta E_{1994}(m, M) \quad (3)$ A t-statistic T is calculated according to equation (4) using this difference S (step S107).

$T = S\sqrt{n/2U^2} \quad (4)$

The t-statistic T conforms to the t distribution with degree of freedom 2(n−1). If, for example, n=10, |T|<2.87 at a significant level of 0.01 (1%). Consequently, if, for example, n=10, and T is larger than 2.87 (step S108), the hypothesis is rejected at a significant level of 1%. That is, since the difference S is significant, the existing profile 35 contradicts the current color reproduction characteristic. In other words, it is evaluated that the existing profile 35 does not reflect the current color reproduction characteristic. Therefore, the profile 35 is updated on the basis of the current calorimetric value (step S109). If T is 2.87 or less, the hypothesis is accepted. That is, it is evaluated that the difference S in calorimetric value is not significant and is coincidentally produced, and the existing profile 35 sufficiently reflects the current color reproduction characteristic. The existing profile 35 is not therefore updated and is kept used without any change (step S110).

Although the profile updating method in step S109 is not specifically defined, the average calorimetric value m acquired in step S104 may be directly used or the method in the ninth to 11th embodiments may be used.

Figure 3:
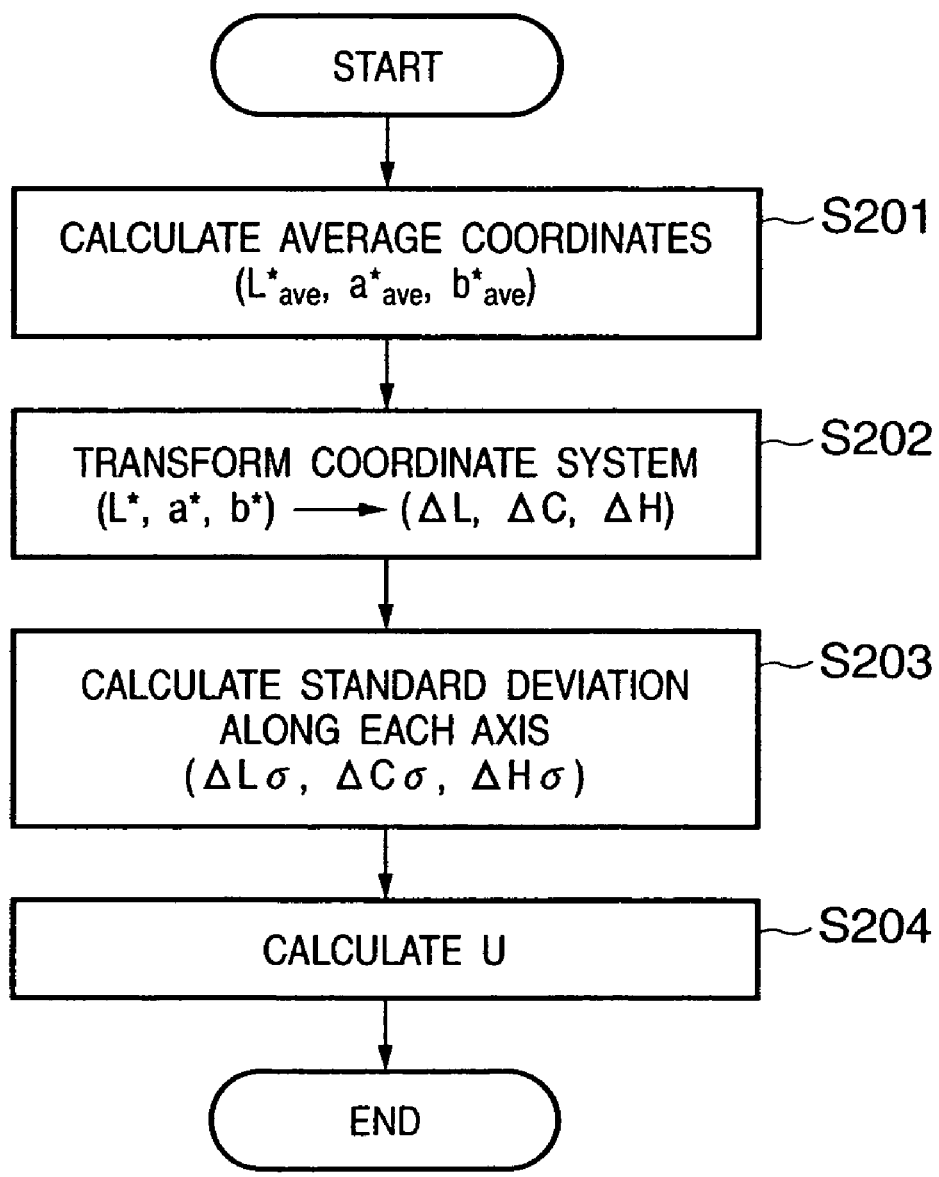
FIG. 3 is a flow chart showing a procedure for calculating a variation evaluation index in this embodiment.

FIG. 3 is a flow chart showing a procedure for calculating the variation evaluation index U in step S103 in FIG. 2.

The variation evaluation index U is obtained by applying the CIE1994 color difference formula to variances in the directions of lightness, chroma (saturation), and hue. With this index, 3D variations can be easily handled. First of all, average coordinates $m(L^*_{ave}, a^*_{ave}, b^*_{ave})$ in the CIE/L*a*b* color space are obtained by equations (1) (step S201).

Subsequently, the calorimetric value is transformed into orthogonal coordinates ΔL, ΔC, and ΔH, by using equation (5), with the average coordinates m being an origin when $C^*_{ave} = \sqrt{\{(a^*_{ave})^2 + (b^*_{ave})^2\}}$, and unit vectors (1, 0, 0), (0, $a^*_{ave}/C^*_{ave}$, $b^*_{ave}/C^*_{ave}$), and (0, $-b^*_{ave}/C^*_{ave}$, $a^*_{ave}/C^*_{ave}$) representing three axes (step S202). Note that ΔL, ΔC, and ΔH respectively correspond to a lightness difference, chroma difference, and hue difference corresponding to the average values.

$$\begin{pmatrix} \Delta L^*_i \\ \Delta C^*_i \\ \Delta H^*_i \end{pmatrix} = \begin{pmatrix} 1 & 0 & 0 \\ 0 & \cos(\theta) & \sin(\theta) \\ 0 & -\sin(\theta) & \cos(\theta) \end{pmatrix} \cdot \begin{pmatrix} L^*_i - L^*_{ave} \\ a^*_i - a^*_{ave} \\ b^*_i - b^*_{ave} \end{pmatrix} \quad (5)$$

for $$\theta = \tan^{-1} \frac{b^*_{ave}}{a^*_{ave}}$$

Figure 4:
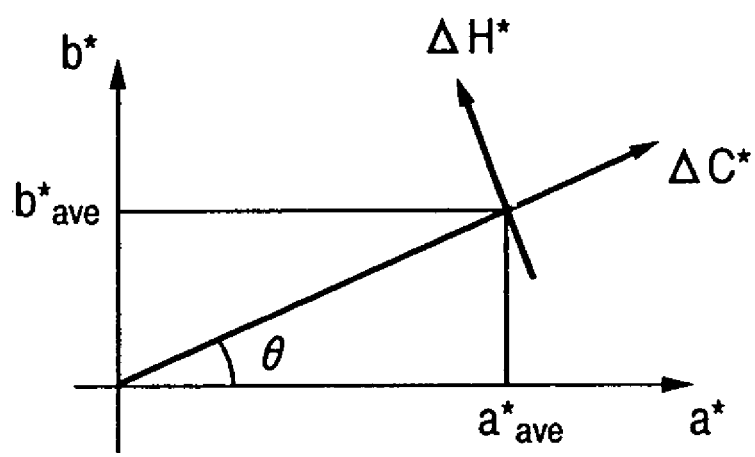
FIG. 4 is a graph showing a coordinate system used to calculate a variation evaluation index in this embodiment.

FIG. 4 shows the relationship between the (a*, b*) coordinate system and the (ΔC, ΔH) coordinate system.

In addition, the sample standard deviation of measured values along the respective axes is obtained by equations (6) (step S203):

$$L^*_\sigma = \sqrt{\frac{\sum_i^n (\Delta L^*_i)^2}{n-1}}$$

$$C^*_\sigma = \sqrt{\frac{\sum_i^n (\Delta C^*_i)^2}{n-1}} \quad (6)$$

$$H^*_\sigma = \sqrt{\frac{\sum_i^n (\Delta H^*_i)^2}{n-1}}$$

The value U given by equation (7) by adapting the obtained values to the CIE1994 color difference formula is set as a variation evaluation index (step S204):

$$U = \sqrt{\{(H^*_\sigma/(1+0.015 C^*_{ave}))^2 + (L^*_\sigma)^2 + (C^*_\sigma/(1+0.045 C^*_{ave}))^2\}} \quad (7)$$

As described above, according to this embodiment, whether the existing profile 35 reflects the current color reproduction characteristic in the image output apparatus can be determined on the basis of the calorimetric value estimated by the profile 35, the average calorimetric value in the current output image from the apparatus, and variations in calorimetric value. By deciding whether to update the profile 35 in accordance with the determination result, an optimal color reproduction characteristic can always be maintained in the profile.

By properly maintaining profiles in a plurality of image output apparatuses in this manner, even when the same color image is processed in a plurality of apparatuses, a good image can be stably reproduced in any apparatuses.

This embodiment has exemplified the update processing for the profile 35 associated with the output apparatus 5. However, the present invention can be equally applied to the input apparatus 1. That is, this embodiment has exemplified the processing based on the average calorimetric value of sample images output from the output apparatus 5. However, by using the average signal value of sample images input by the input apparatus 1 instead of the above value, the profile 34 associated with the input apparatus 1 can also be updated properly in the same manner as described above. This technique is especially effective when the input apparatus 1 is a scanner for reading images.

In the following description about processing common to the profiles 34 and 35, they are simply referred to as profiles without discrimination between them.

<Second Embodiment>

The second embodiment of the present invention will be described below. Since the arrangement of an image processing apparatus according to the second embodiment is the same as that of the first embodiment shown in FIG. 1, a description thereof will be omitted.

In the second embodiment, a calorimetric value and the like at the time of creation of a profile in an image output apparatus are retained as additional information, together with the profile. According to a characterized feature of this embodiment, whether the profile reflects the current color reproduction characteristic is determined on the basis of the retained calorimetric value, the average colorimetric value of the current output image from the apparatus, and variations in calorimetric value.

Figure 5:
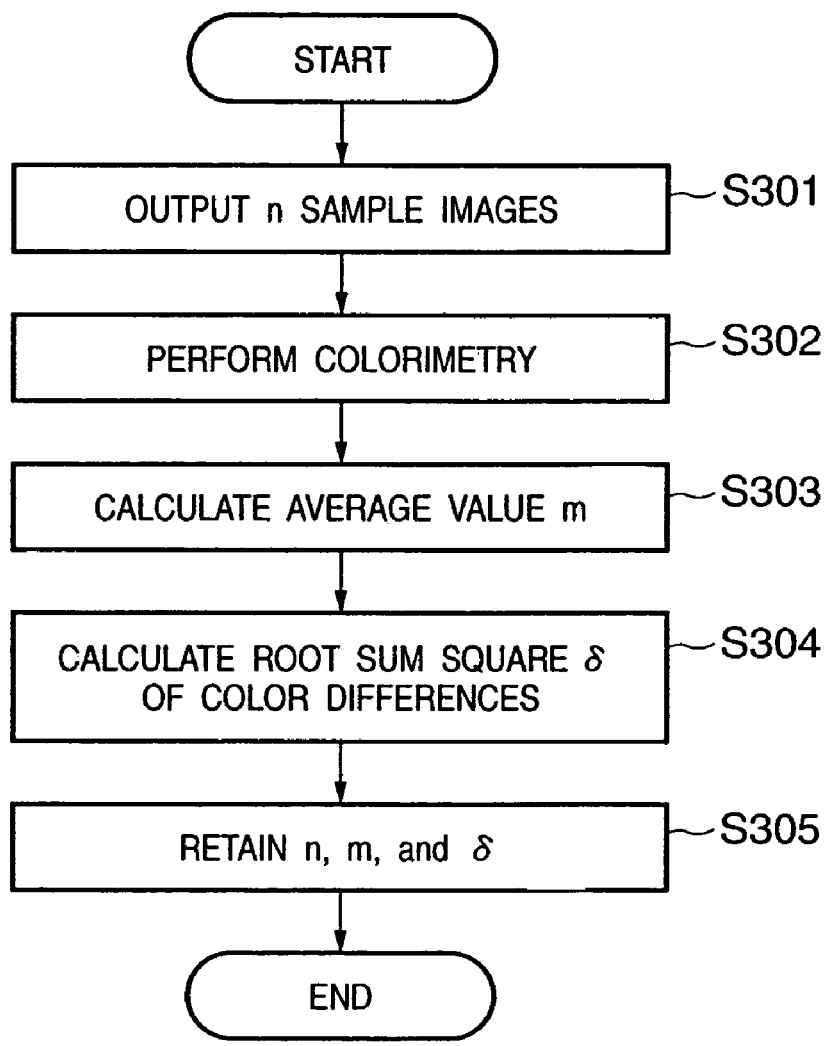
FIG. 5 is a flow chart showing additional information acquisition processing at the time of creation of a profile in the second embodiment.

A procedure for acquiring additional information at the time of creation of a profile in the second embodiment will be described first with reference to the flow chart of FIG. 5.

To check the current color reproduction characteristic in an output apparatus 5, n color signals for a color reproduction characteristic check are output as a predetermined sampling count (step S301), and the output image is calorimetrically measured (step S302).

On the basis of respective calorimetric values $m_i$: ($L^*_i$, $a^*_i$, $b^*_i$), an average value m of the calorimetric values is calculated according to equations (1) (step S303). A root sum square δ of the color differences between the respective calorimetric values $m_i$ is calculated according to equation (8) (step S304).

$$\delta = \sum_{i}^{N} (\Delta E_{1994}(m_i, m))^2 \qquad (8)$$

The average value m, color difference root sum square δ, and sampling count n are retained as additional information in the profile created on the basis of the calorimetric values $m_i$ or a memory or the like (not shown) in an image processing unit 3 in correspondence with the profile (step S305).

Figure 6:
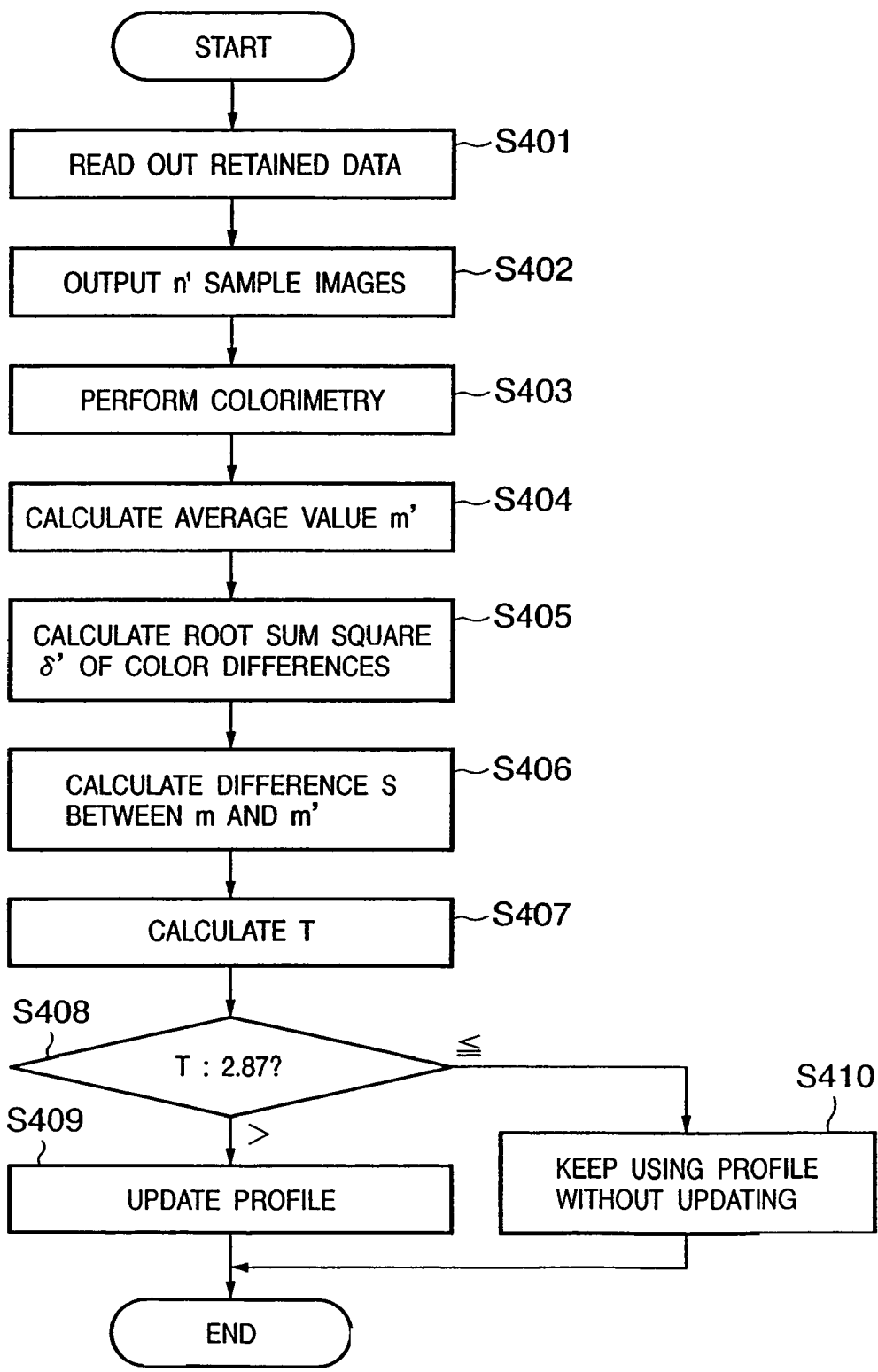
FIG. 6 is a flow chart showing profile update processing in the second embodiment.

Profile update processing in the second embodiment will be described next with reference to the flow chart of FIG. 6.

First of all, the additional information retained at the time of creation of a profile is read out (step S401) A proper sampling count n' is then determined, and n' color signals for a color reproduction characteristic check are output (step S402) to calorimetrically measure the output image (step S403).

On the basis of calorimetric values m'$_i$, an average value m' of the calorimetric values is calculated according to equations (1) (step S404). A root sum square δ' of the color differences between the calorimetric values is calculated according to equation (8) (step S405).

A difference S between the average value m at the time of creation of the profile and a current average value m' is calculated according to equation (9) (step S406).

$$S = \Delta E_{1994}(m, m') \qquad (9)$$

At this time, a t-statistic T is calculated according to equation (10) given below (step S407):

$$T = S\sqrt{\{nn'(n+n'-2)/(\delta+\delta')(n+n')\}} \qquad (10)$$

The t-statistic T conforms to the t distribution of degrees of freedom (n+n'−2). If, for example, n=n'=10, |T|<2.87 at a significant level of 0.01. If, therefore, for example, n=n'=10, and T is larger than 2.87 (step S408), the hypothesis that "the difference S between the average value m at the time of creation of the profile and the current sample average m' is incidentally produced in a sample extracted from a population having the same average value" is rejected at a significant level of 1%. That is, since the difference S is significant, it is determined that the existing profile differs from the current color reproduction characteristic, and the profile is updated on the basis of the current colorimetric value (step S409). If T is 2.87 or less, the above hypothesis is accepted, and the existing profile is kept used without any change (step S410).

As described above, according to the second embodiment, whether the existing profile reflects the current color reproduction characteristic in the image output apparatus can be determined on the basis of the calorimetric value at the time of creation of the profile, the average calorimetric value in the current output image from the apparatus, and variations in calorimetric value. By deciding whether to update the profile in accordance with the determination result, an optimal color reproduction characteristic can always be maintained in the profile as in the first embodiment described above.

<Third Embodiment>

The third embodiment of the present invention will be described below. Since the arrangement of an image processing apparatus according to the third embodiment is the same as that of the first embodiment shown in FIG. 1, a description thereof will be omitted.

In the third embodiment, a variation evaluation index U at the time of creation of a profile in an image output apparatus is retained as additional information, together with the profile. According to a characteristic feature of this embodiment, whether the profile reflects the current color reproduction characteristic is checked on the basis of the retained variation evaluation index U and the average colorimetric value of the current output image from the apparatus.

Figure 7:
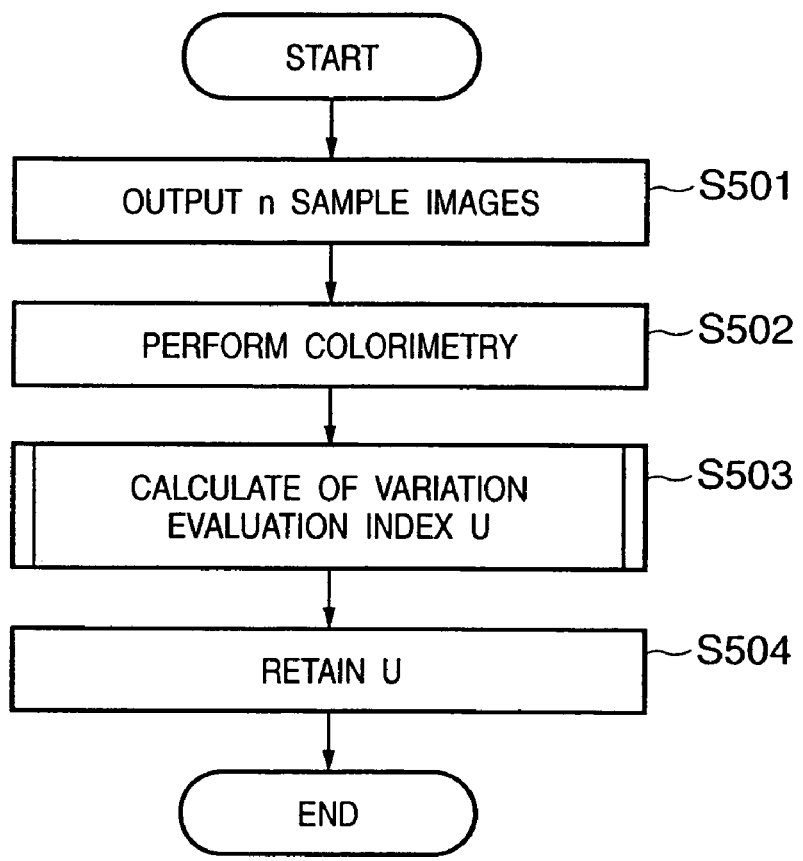
FIG. 7 is a flow chart showing a procedure for acquiring a variation evaluation index U at the time of creation of a profile in the third embodiment.

A procedure for acquiring the variation evaluation index U at the time of creation of a profile in the third embodiment will be described first with reference to the flow chart of FIG. 7.

To check the current color reproduction characteristic in an output apparatus 5, n color signals for a color reproduction characteristic check are output as a predetermined sampling count (step S501), and the output image is calorimetrically measured (step S502).

On the basis of respective calorimetric values $m_i$: ($L^*_i$, $a^*_i$, $b^*_i$), the color variation evaluation index U is calculated in accordance with the flow chart of FIG. 3 (step S503).

This variation evaluation index U is retained as additional information in the profile created on the basis of the calorimetric value $m_i$ or a memory or the like (not shown) in the image processing unit 3 in correspondence with the profile (step S504).

Figure 8:
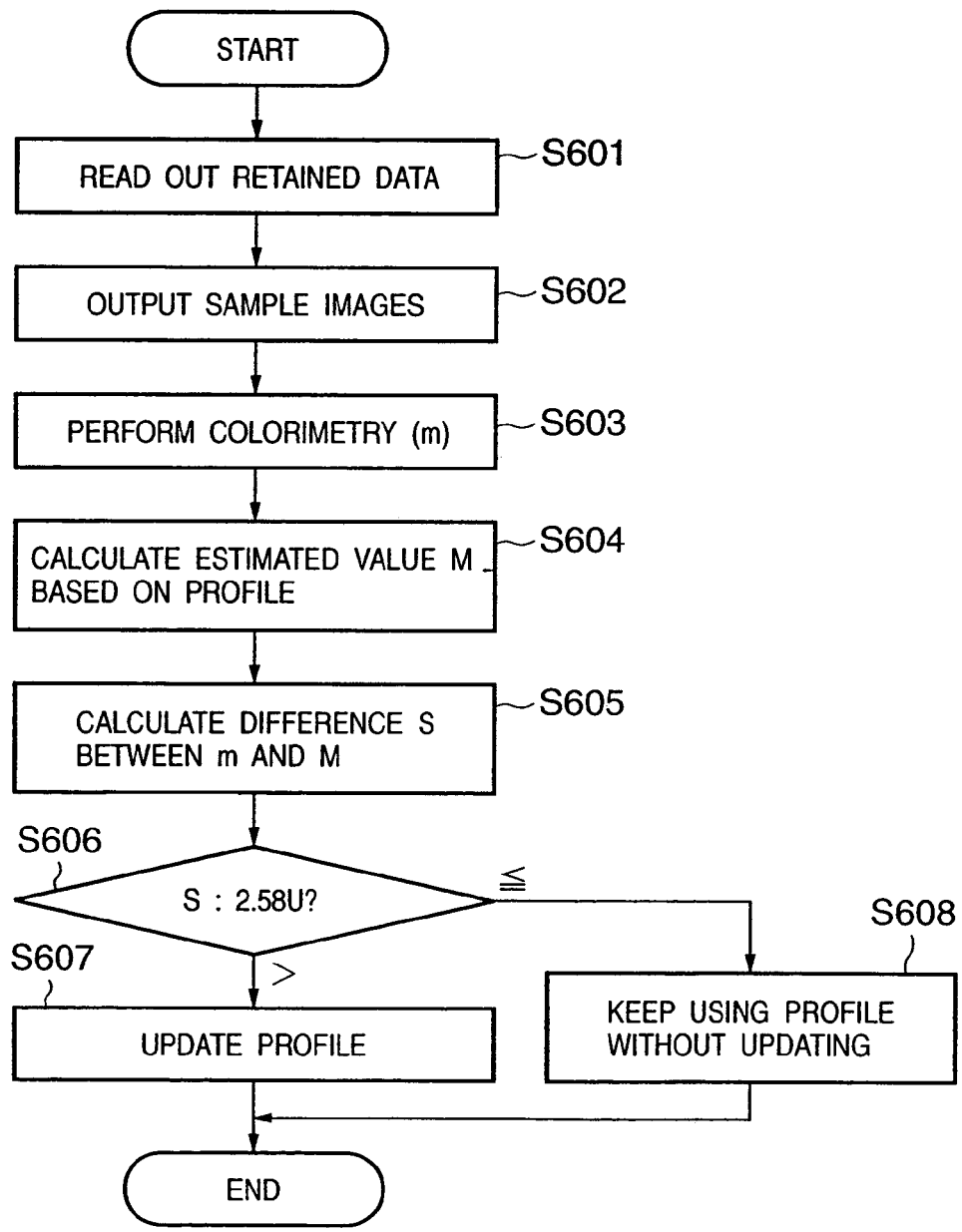
FIG. 8 is a flow chart showing profile update processing in the third embodiment.

Profile update processing in the third embodiment will be described next with reference to the flow chart of FIG. 8.

The value of the retained variation evaluation index U is read out (step S601). A proper sampling count n is then determined, and n color signals for a color reproduction characteristic check are output (step S602) to calorimetrically measure the output image to obtain a calorimetric value m (step S603).

A colorimetric value M corresponding to the above color signal is obtained by using the existing profile (step S604), and a difference S between these values M and m is calculated according to equation (3) (step S605).

Letting M be the estimated population mean of colors output from the apparatus in accordance with the above color signal, and $U^2$ be the estimated population variance, S<2.58 U at a significant level of 0.01 if the characteristics of the apparatus have not changed. If, therefore, S exceeds 2.58U (step S606), it is determined that the existing profile differs from the current color reproduction characteristic, and the profile is updated (step S607). If S is 2.58 or less, it is determined that the color reproduction characteristic remains unchanged, the existing profile is kept used without any change (step S608).

As described above, according to the third embodiment, the variation evaluation index U at the time of creation of a profile is retained, and whether the profile reflects the current color reproduction characteristic is determined by using the variation evaluation index U. In determining the necessity to update a profile, there is no need to calculate the variation evaluation index U as in the first and second embodiments, and hence the determination result can be obtained faster.

The first to third embodiments described above have exemplified the case where the sampling count n or n' is set to 10, and a significant level for a test is set to 0.01. Obviously, however, in the present invention, other values can be used.

In addition, the CIE/L*a*b* color space and CIE1994 color difference formula are used as a device-independent color space and color different formula, respectively. Instead of them, however, another color space such as the CIE/XYZ or CIE/L*u*v* color space and another color difference formula such as the CIE1976, CMC, BFD, or MLAB color difference formula may be used.

If the determination result indicates that the profile does not correspond to the current color reproduction characteristic, the user may be notified of the corresponding information instead of unconditional execution of profile updating. Thereafter, whether to update the profile may be determined in accordance with an instruction from the user.

<Fourth Embodiment>

The fourth embodiment of the present invention will be described below. Since the arrangement of an image processing apparatus according to the fourth embodiment is the same as that of the first embodiment shown in FIG. 1, a description thereof will be omitted.

As described above, when the color reproduction characteristic of an image input/output apparatus changes, the precision of a calorimetric value (coordinates in a device-independent color space) estimated by the profile deteriorates. In the fourth embodiment, for example, an output-side color space transformation unit 33 obtains the difference between the calorimetric value estimated by an existing profile 35 and the calorimetric value in the current output image from an output apparatus 5 as a calorimetric value estimation error. By presenting the obtained estimated value to a profile manager, the profile manager can determine the validity of the current profile.

Figure 9:
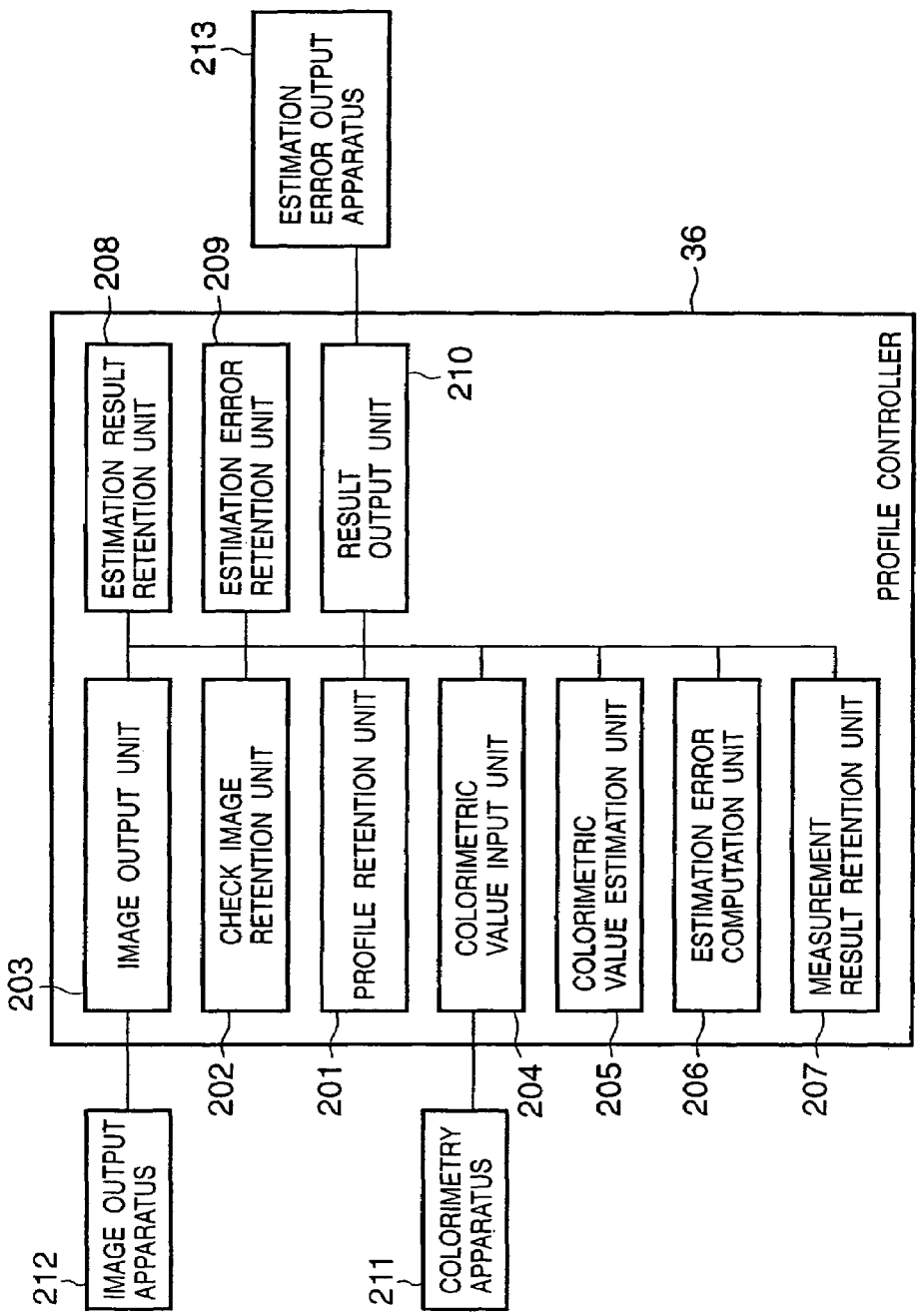
FIG. 9 is a block diagram showing the detailed arrangement of a profile controller in the fourth embodiment.

FIG. 9 is a view showing a detailed arrangement for implementing profile evaluation processing according to the fourth embodiment mainly in a profile controller 36. As shown in FIG. 9, the profile controller 36 is comprised of a profile retention unit 201, check image retention unit 202, image output unit 203, calorimetric value input unit 204, calorimetric value estimation unit 205, estimation error computation unit 206, measurement result retention unit 207, estimation result retention unit 208, estimation error retention unit 209, and result output unit 210. A colorimetry apparatus 211, image output apparatus 212, and estimation error output apparatus 213 are connected to the profile controller 36.

Referring to FIG. 9, the image output apparatus 212 corresponds to the output apparatus 5 in FIG. 1, and the profile 35 is loaded in the profile retention unit 201.

The check image retention unit 202 stores predetermined color image data used to check a calorimetric value estimation error. This color image data is visualized/output onto a printing sheet by the image output apparatus 212 through the image output unit 203. The output image is calorimetrically measured by the colorimetry apparatus 211, and the colorimetry result is stored in the measurement result retention unit 207 through the calorimetric value input unit 204.

A profile for the image output apparatus 212 is stored in the profile retention unit 201. The calorimetric value estimation unit 205 estimates the calorimetric value of the color image data stored in the check image retention unit 202 by using the profile, and stores the estimation result in the estimation result retention unit 208.

The estimation error computation unit 206 obtains an estimation error as the color difference between the actual calorimetric value reflecting the current color reproduction characteristic, stored in the measurement result retention unit 207, and the estimated calorimetric value based on the current profile, stored in the estimation result retention unit 208, and stores the result in the estimation error retention unit 209.

The result output unit 210 outputs the estimation error stored in the estimation error retention unit 209 to the estimation error output apparatus 213.

Note that the colorimetry apparatus 211 is an apparatus capable of obtaining a calorimetric value such as CIE/L*a*b* with respect to the color of a visualized image, and is typified by a spectroreflectometer, a calorimeter, or a high-resolution color scanner with an input profile. The estimation error output apparatus 213 is an apparatus for presenting the colorimetric value estimation error based on the existing profile to the profile manager, and is typified by a display, printer, and the like. The calorimetric value input unit 204 is a unit for inputting an output from the colorimetry apparatus 211 to the profile controller 36 by using some means, and is typified by a keyboard, disk, network, and the like.

Figure 10:
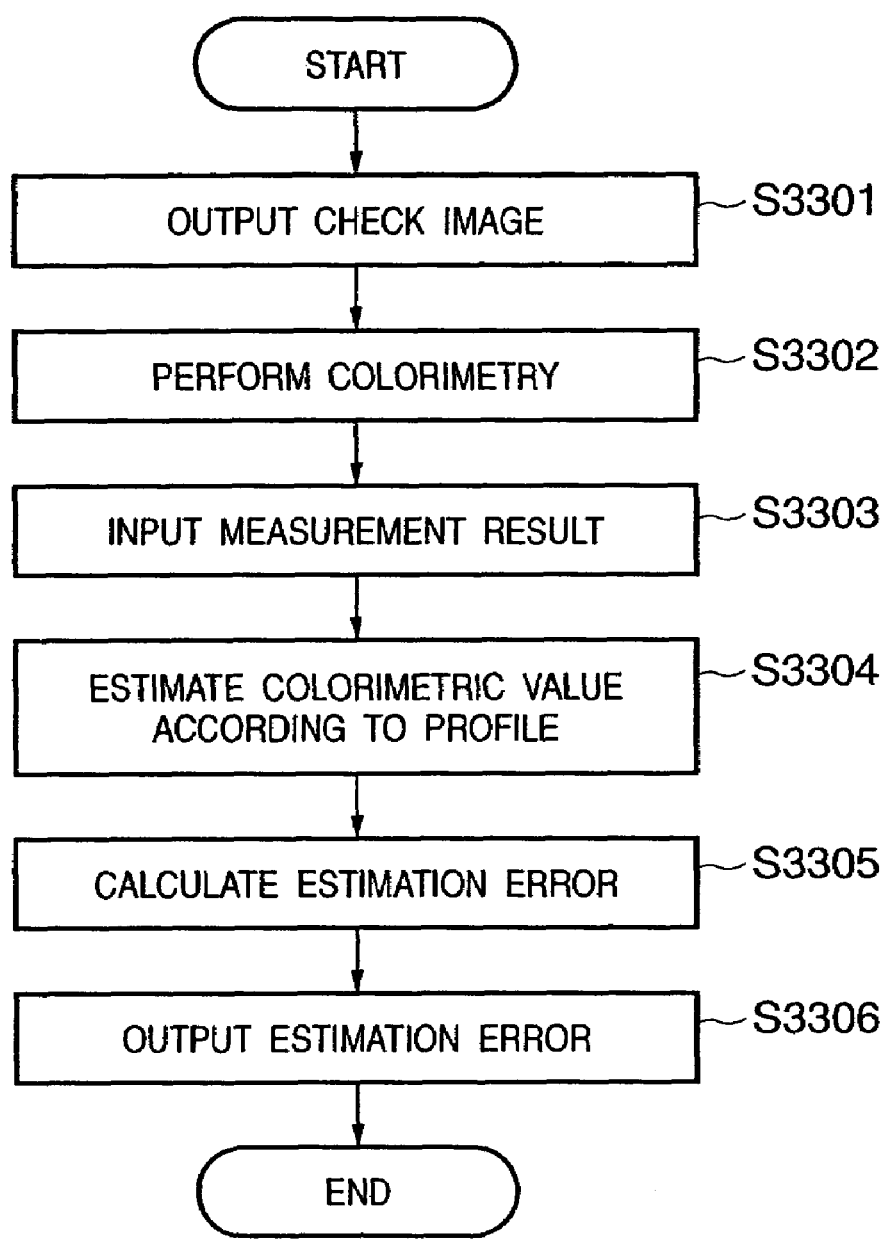
FIG. 10 is a flow chart showing a procedure for outputting a profile estimation precision in the fourth embodiment.

FIG. 10 is a flow chart showing a procedure for outputting a calorimetric value estimation error in the fourth embodiment.

The color image data stored in the check image retention unit 202 is output from the image output apparatus 212 through the image output unit 203 (step S3301). The colorimetry apparatus 211 measures a predetermined portion of the output image (step S3302). The calorimetric value input unit 204 inputs the calorimetric value obtained by the colorimetry apparatus 211 and stores it in the measurement result retention unit 207 (step S3303).

The calorimetric value estimation unit 205 estimates a calorimetric value corresponding to a predetermined portion of the color image data stored in the check image retention unit 202 by using the profile stored in the profile retention unit 201, and stores the estimation result in the estimation result retention unit 208 (step S3304).

The estimation error computation unit 206 calculates an estimation error on the basis of the measurement result stored in the measurement result retention unit 207 and the estimation result stored in the estimation result retention unit 208, and stores the result in the estimation error retention unit 209 (step S3305). The result output unit 210 outputs (e.g., display) the estimation error stored in the estimation error retention unit 209 to the estimation error output apparatus 213 (step S3306).

The estimation error check image stored in the check image retention unit 202 will be described below.

Figure 11:
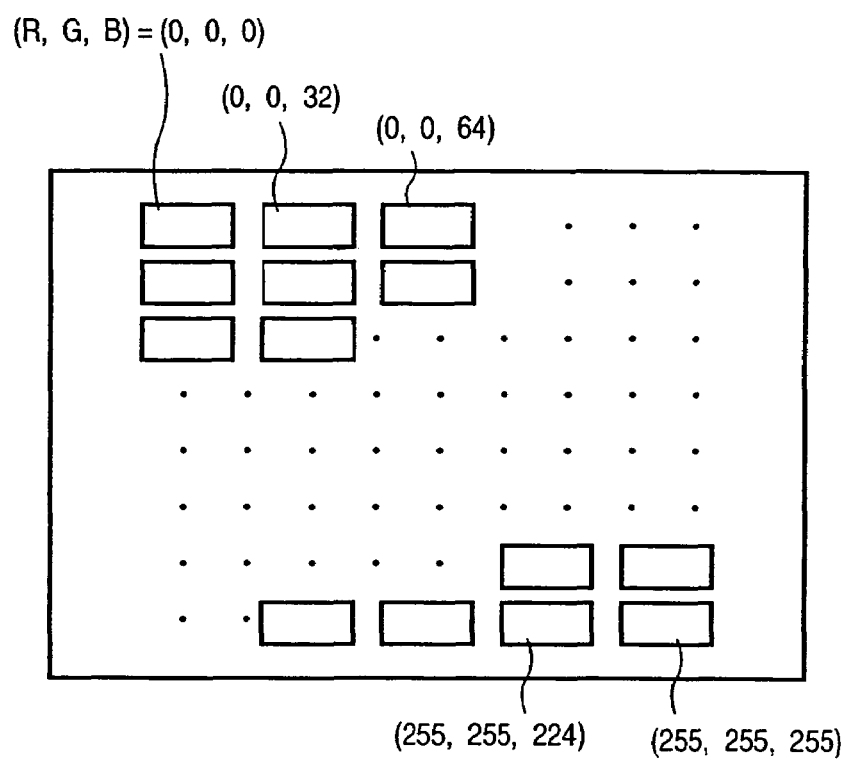
FIG. 11 is a view showing an example of an image for a estimation precision check in the fourth embodiment.

FIG. 11 shows an example of the color image data stored in the check image retention unit 202. This color image data is constituted by color chips evenly extracted from the color space dependent on the image output apparatus 212. Each color chip has a size large enough to be measured by the colorimetry apparatus 211. In the color signals of the respective color chips, the respective values of [R, G, B] represent 729 colors constituted by the elements of a set {0, 32, 64, . . . , 224, 255}, i.e., [0, 0, 0], [0, 0, 32], [0, 0, 64], . . . , [0, 0, 224], [0, 0, 255], [0, 32, 0], [0, 32, 32], . . . , [255, 255, 255].

Obviously, color image data used for an estimation error check is not limited to the example shown in FIG. 11.

In step S3302 described above, colorimetry is performed for each color chip in the output image from the image output apparatus 212. In step S3304, a colorimetric value corresponding to the color signal of each color chip is estimated by using the transformation formula or table held in the profile.

An output image from the estimation error output apparatus 213 will be described below.

Figure 12:
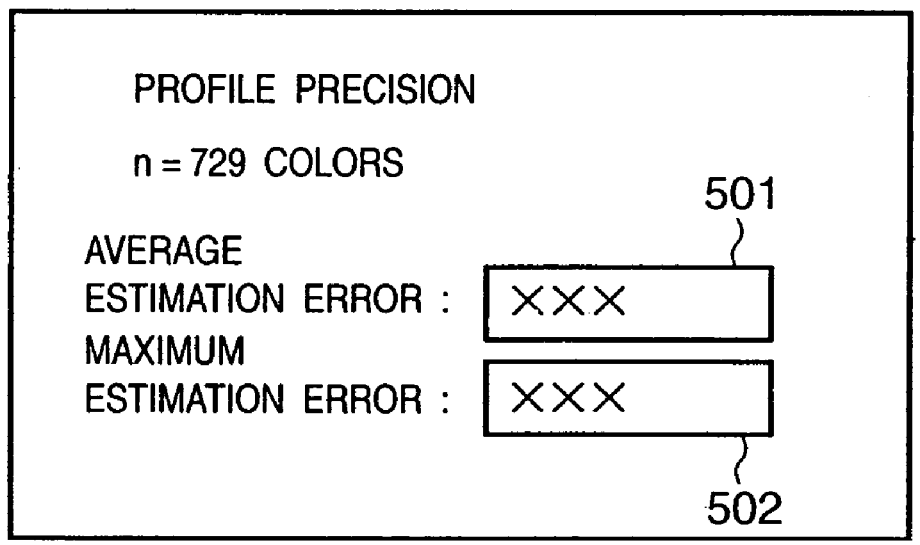
FIG. 12 is a view showing an example of how a profile estimation precision is output in the fourth embodiment.

FIG. 12 shows a display example of the output image. The output image shown in FIG. 12 displays an average value

501 and maximum value 502 of estimation errors. In this case, an estimation error is the color difference between the measurement result on the current output image from the image output apparatus 212, input in step S3303, and the calorimetric value estimated from the existing profile, obtained in step S3304. In the fourth embodiment, the average and maximum value of the estimation errors (the color differences) in the above 729 colors are calculated and displayed.

Note that a color difference may be calculated by using the CIE1994 color difference formula represented by equation (2). That is, co11 and co12 in equation (2) respectively correspond to the measurement result input in step S3303 and the calorimetric value estimation result calculated in step S3304.

By displaying an image like the one shown in FIG. 12, the profile manager can check the average value and maximum value of estimation errors, and hence can determine the validity of the profile. For example, if the displayed estimation error is large, the profile manager determines that the profile must be updated to realize good color reproduction by using a CMS.

As described above, according to the fourth embodiment, the difference between the calorimetric value estimated on the basis of the existing profile and the calorimetric value in the current output image form the image output apparatus can be checked. As a consequence, the profile manager can check the color reproduction precision based on the existing profile, i.e., whether the profile properly reflects the current color reproduction characteristic of the apparatus, and hence can determine whether to update the profile. The profile manager can therefore always maintain each profile in an optimal state.

In this manner, the profile manager properly manages the profiles in a plurality of image output apparatuses. When, therefore, the same color image is to be processed in a plurality of apparatuses, color reproduction intended by the profile manager can be realized in each apparatus.

In the fourth embodiment, calorimetric value estimation errors associated with the output apparatus 5 have been described. However, the present invention can be equally applied to an input apparatus 1. More specifically, in the fourth embodiment, an estimation error is obtained on the basis of the difference between the calorimetric value estimated from color image data and the calorimetric value of the image output from the output apparatus 5. By using the difference between the calorimetric value of an input image (original) and the calorimetric value estimated from the color image data input by the input apparatus 1 instead of the above value, an estimation error can be obtained in the input apparatus 1 in the same manner as described above.

<Fifth Embodiment>

The fifth embodiment of the present invention will be described below. The arrangement of an image processing apparatus and a profile estimation method according to the fifth embodiment are the same as those described with reference to FIGS. 1, 9, and 10, and hence a description thereof will be omitted.

According to a characteristic feature of the fifth embodiment, calorimetric value estimation errors based on an existing profile are output in association with a plurality of colors.

In the fifth embodiment, the color image data for an estimation error check which is stored in a check image retention unit 202 is constituted by color chips of colors expected to often exist in photographic images taken by a camera, e.g., a skin color, azure, and verdure. Alternatively, this color image data may be constituted by color chips of colors expected to be often used in business documents, tables, and graphs or colors often used in computer graphics (CG). That is, the above color image data is constituted by color chips of colors considered important in general color images.

Obviously, color image data for an estimation error check may be formed by mixing a color chip for a photographic image, a color chip for a business document, and a color chip for CG.

In the fifth embodiment, estimation errors for the existing profile are calculated for colors considered important in a general image and output.

Figure 13:
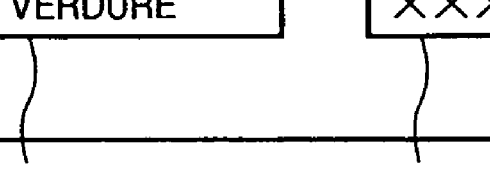
FIG. 13 is a view showing an example of how a profile estimation precision is output in the fifth embodiment.

FIG. 13 shows an example of how estimation errors are displayed in the fifth embodiment. According to the display example shown in FIG. 13, pairs of color names 601 and estimation errors 602 are output for the respective colors.

As described above, according to the fifth embodiment, the profile manager can check an estimation error about each color and determine the validity of the existing profile in accordance with the application purpose of the image output apparatus, colors considered important in an output target image, and the like.

<Sixth Embodiment>

The sixth embodiment of the present invention will be described below.

According to a characteristic feature of the sixth embodiment, a calorimetric value estimation error based on the existing profile is output in association with an arbitrary color signal.

Figure 14:
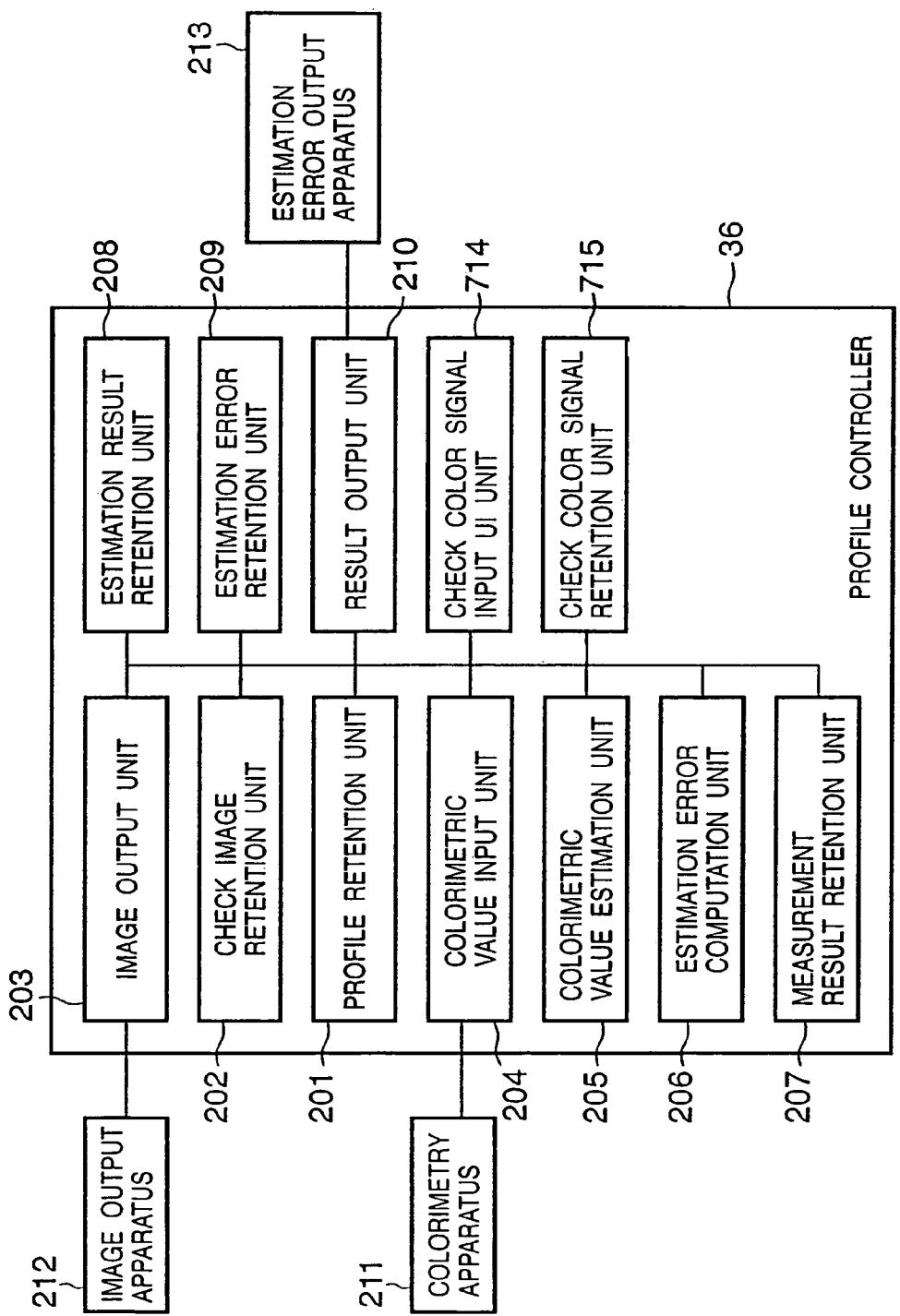
FIG. 14 is a block diagram showing the detailed arrangement of a profile controller in the sixth embodiment.

FIG. 14 shows the arrangement of a profile controller 36 in the sixth embodiment. A characteristic feature of the arrangement shown in FIG. 14 is that it includes a check color signal input UI (User Interface) unit 714 and check color signal retention unit 715 in addition to the arrangement shown in FIG. 9 in the fourth embodiment. The check color signal input UI unit 714 has a color signal input UI and final color signal check UI, and inputs a check color signal upon user operation. The check color signal retention unit 715 stores one or a plurality of sets of estimation error check color signals input through the check color signal input UI unit 714. Note that the same reference numerals as in FIG. 9 denote the same parts in FIG. 14, and a description thereof will be omitted.

Figure 15:
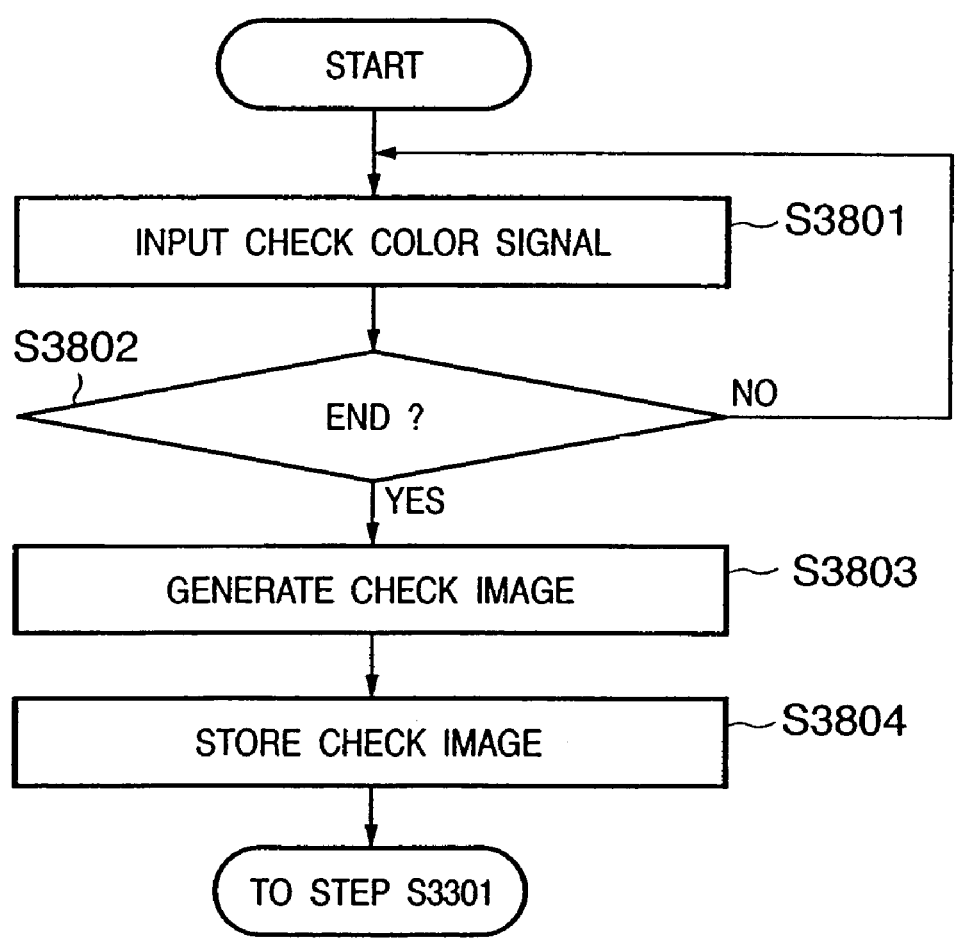
FIG. 15 is a flow chart showing a procedure for outputting a profile estimation precision in the sixth embodiment.

FIG. 15 is a flow chart showing a procedure for outputting a calorimetric value estimation error in the sixth embodiment.

First of all, the check color signal input UI unit 714 inputs a check color signal through the color signal input UI, and stores the signal in the check color signal retention unit 715 (step S3801). The check color signal input UI unit 714 inputs through the final color signal check UI a user instruction to indicate whether to keep inputting a check color signal (step S3802). If input operation is to be continued, the flow returns to step S3801. If the input operation is to be terminated, the flow advances to step S3803.

Upon completion of the input operation for the check color signal, on the basis of the color signal stored in the check color signal retention unit 715, color image data for a calorimetric value estimation error check which is constituted by the color chip of the color signal is generated (step S3803), and is stored in a check image retention unit 202 (step S3804).

Since the same processing as that described with reference to FIG. 10 in the fourth embodiment is started (steps S3301 to S3306), a description thereof will be omitted.

Figure 16:
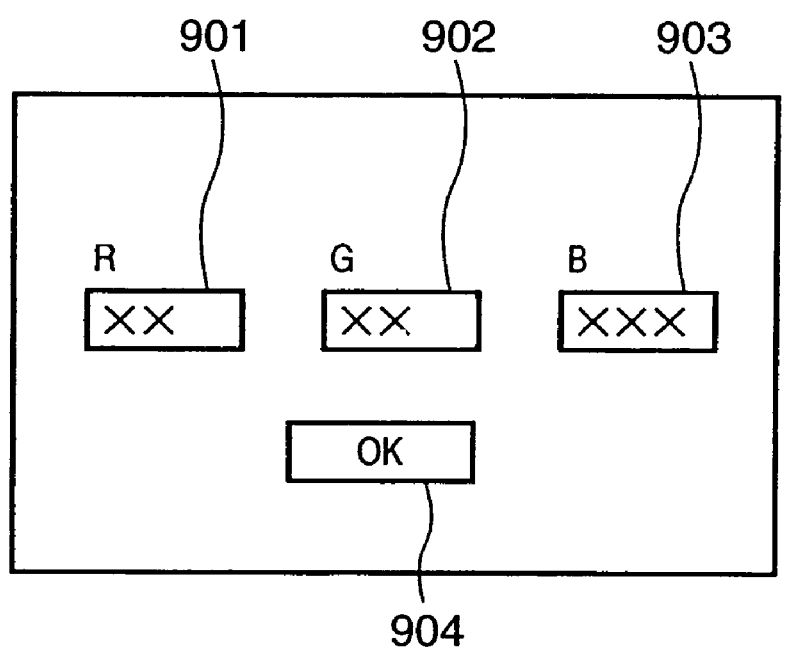
FIG. 16 is a view showing an example of a color signal input UI in the sixth embodiment.

FIG. 16 shows an example of the color signal input UI used in step S3801. This UI is comprised of an R signal input portion 901, G signal input portion 902, B signal input portion 903, and OK button 904. The user inputs color signal values for which he/she wants to check estimation errors to the R, G, and B signal input portions 901, 902, and 903. When the OK button 904 is selected, the input R, G, and B color signal values are stored in the check color signal retention unit 715. The flow then advances to step S3802.

Figure 17:
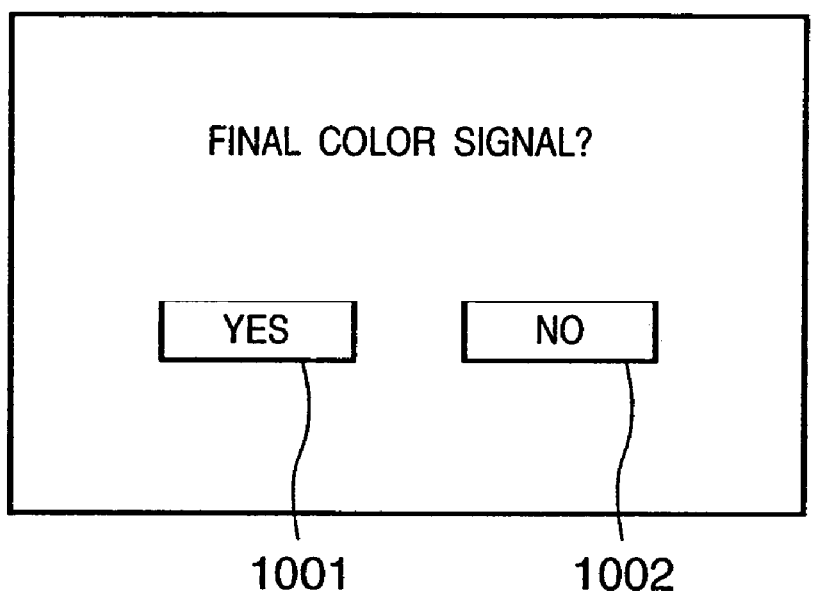
FIG. 17 is a view showing an example of a final color signal check UI in the sixth embodiment.

FIG. 17 shows an example of the final color signal check UI used in step S3802. This UI is comprised of an YES button 1001 and NO button 1002. If the YES button 1001 is selected, the flow advances to step S3803. When the NO button 1002 is selected, the flow advances to step S3801 to wait for inputting the next color signal.

Figure 18:
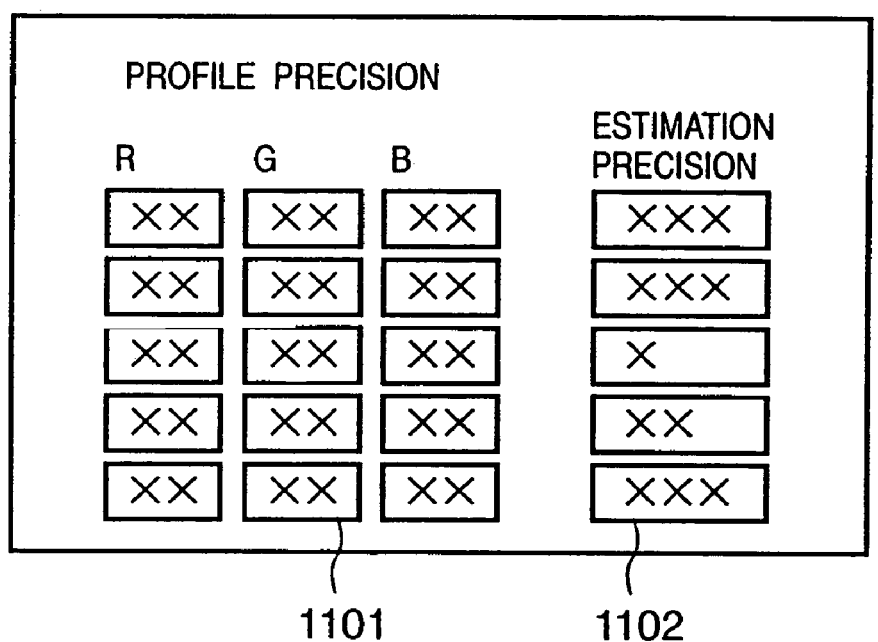
FIG. 18 is a view showing an example of how profile estimation precisions are output in the sixth embodiment.

FIG. 18 shows an example of how estimation errors are displayed in the sixth embodiment. According to the display example shown in FIG. 18, sets of color signal values 1101 and estimation errors 1102 are output in correspondence with the number of colors input through the color signal input UI. That is, the color signal value 1101 is the color signal value input in step S3801, and the estimation error 1102 is a calorimetric value estimation error corresponding to the color signal value.

As described above, according to the sixth embodiment, the profile manager can check an estimation error about a specific color signal and determine the validity of the exiting profile.

<Seventh Embodiment>

The seventh embodiment of the present invention will be described below.

According to a characteristic feature of the seventh embodiment, an calorimetric value estimation error based on the exiting profile is output with respect to an arbitrary calorimetric value.

Figure 19:
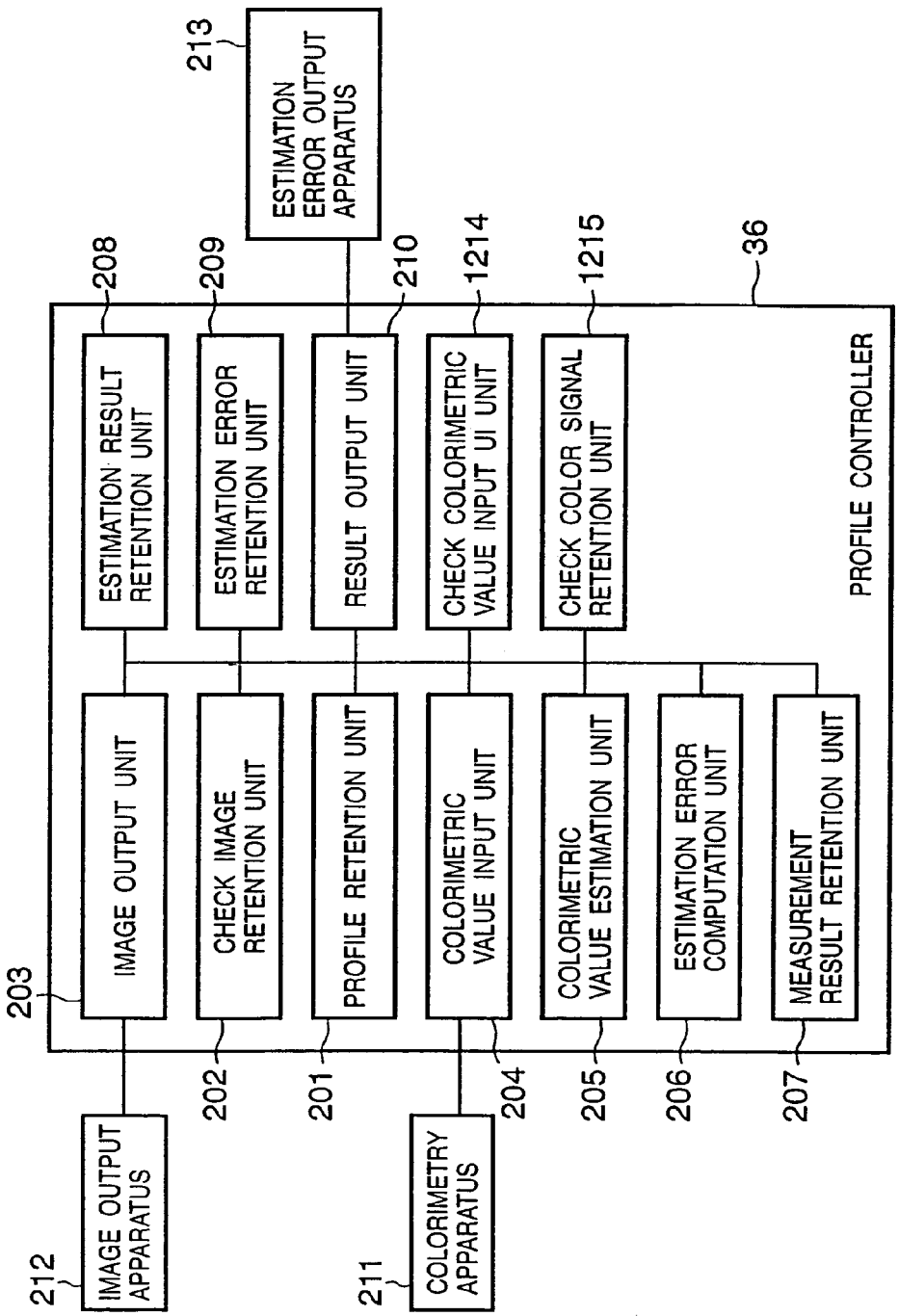
FIG. 19 is a block diagram showing the detailed arrangement of a profile controller in the seventh embodiment.

FIG. 19 shows the arrangement of a profile controller 36 according to the seventh embodiment. A characteristic feature of the arrangement shown in FIG. 19 is that it has a check calorimetric value input UI unit 1214 and check color signal retention unit 1215 in addition to the arrangement shown in FIG. 9 in the fourth embodiment. The check calorimetric value input UI unit 1214 has a calorimetric value input UI and final calorimetric value check UI, and inputs a check calorimetric value upon user operation. The check color signal retention unit 1215 stores estimation error check color signals corresponding to one or a plurality of sets of colorimetric values input through the check calorimetric value input UI unit 1214. Note that the same reference numerals as in FIG. 9 denote the same parts in FIG. 19, and a description thereof will be omitted.

Figure 20:
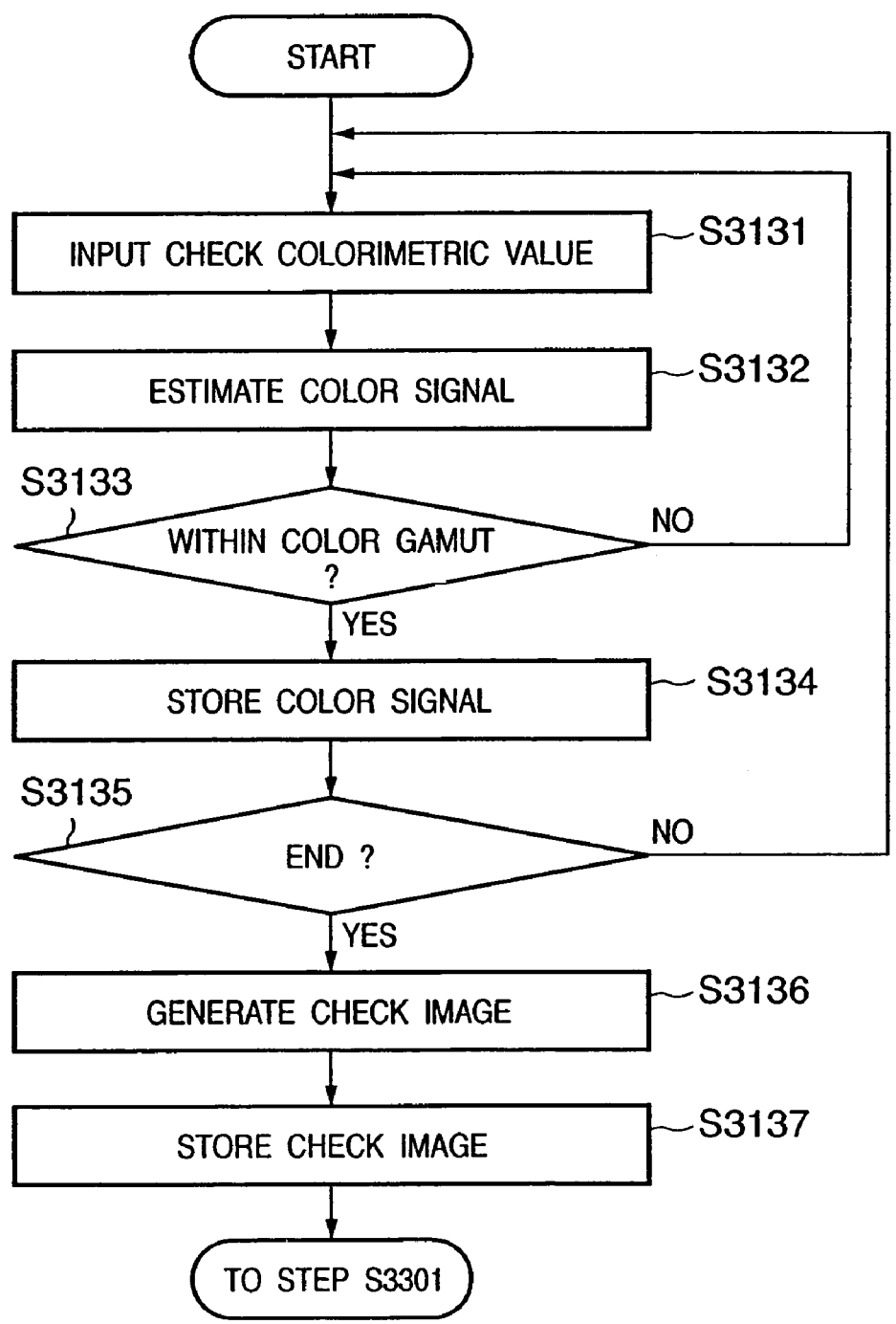
FIG. 20 is a flow chart showing a procedure for outputting a profile estimation precision in the seventh embodiment.

FIG. 20 is a flow chart showing a procedure for outputting calorimetric value estimation errors in the seventh embodiment.

First of all, the check calorimetric value input UI unit 1214 inputs a check calorimetric value through the calorimetric value input UI (step S3131). A color signal corresponding to the input calorimetric value is estimated by using the existing profile stored in a profile retention unit 201 (step S3132). It is then checked whether the input calorimetric value falls within the color reproduction range of an image output apparatus 212 (step S3133). If it falls outside the reproduction range, the corresponding information is notified (displayed), and the flow returns to step S3131. If it falls within the color reproduction range, the flow advances to step S3134 to store the color signal estimated in step S3132 in the check color signal retention unit 1215.

The check calorimetric value input UI unit 1214 inputs through the final calorimetric value check UI a user instruction indicating whether to continue to input a check calorimetric value (step S3135). If the instruction indicates the continuation of inputting, the flow returns to step S3131. If the instruction indicates the termination of inputting, the flow advances to step S3136.

When all check calorimetric values are completely input, color image data for a calorimetric value estimation error check is formed by using the color chips of the color signals stored in the check color signal retention unit 1215 (step S3136), and is stored in a check image retention unit 202 (step S3137).

Subsequently, the same processing as that described with reference to FIG. 10 in the fourth embodiment is started (steps S3301 to S3306), and hence a description thereof will be omitted.

Figure 21:
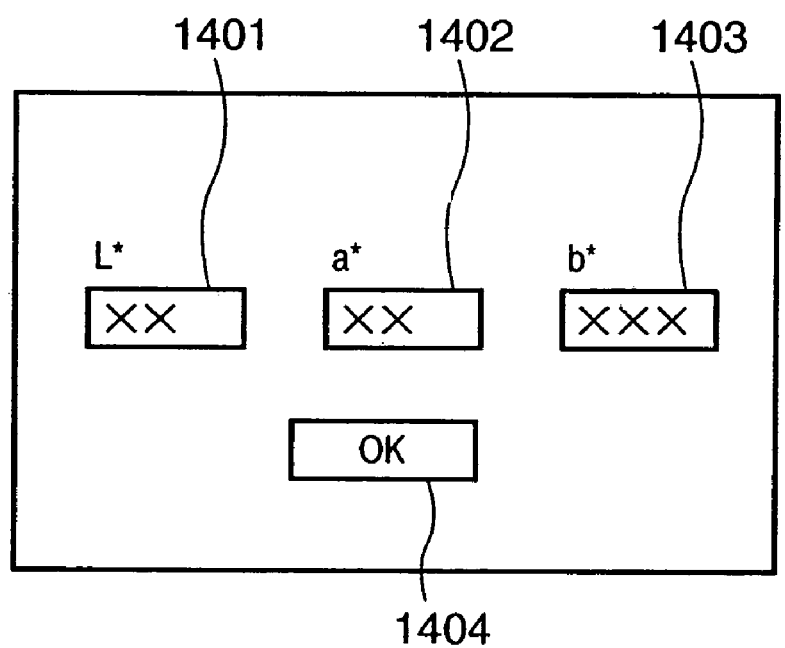
FIG. 21 is a view showing an example of a calorimetric value input UI in the seventh embodiment.

FIG. 21 shows an example of the calorimetric value input UI used in step S3131 described above. This UI is comprised of an L* input portion 1401, a* input portion 1402, b* input portion 1403, and OK button 1404. The user inputs calorimetric values for which he/she wants to check estimation errors to the L*, a*, and b* input portions 1401, 1402, and 1403. When the OK button 1404 is selected, the flow advances to step S3132.

Figure 22:
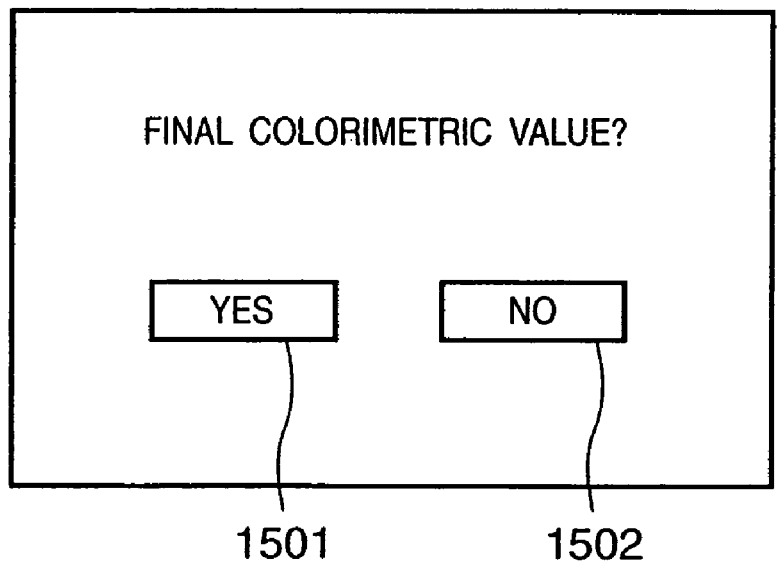
FIG. 22 is a view showing an example of a final color signal check UI in the seventh embodiment.

FIG. 22 shows an example of the final calorimetric value check UI used in step S3135. This UI is comprised of a YES button 1501 and NO button 1502. When the YES button 1501 is selected, the flow advances to step S3136. If NO button 1502 is selected, the flow advances to step S3131 to wait for inputting the next calorimetric value.

Figure 23:
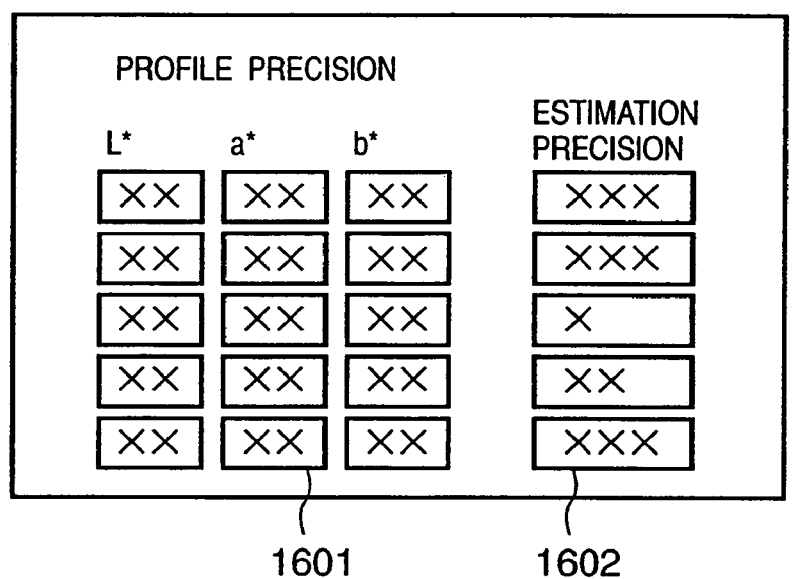
FIG. 23 is a view showing an example of how profile estimation precisions are output in the seventh embodiment.

FIG. 23 shows an example of how estimation errors are displayed in the seventh embodiment. According to the display example shown in FIG. 23, sets of colorimetric values 1601 and estimation errors 1602 are output in correspondence with the number of colors input through the colorimetric value input UI. That is, the calorimetric value 1601 is the calorimetric value input in step S3131, and the estimation error 1602 is the color difference between the calorimetric value of the image output on the basis of the estimated value of a color signal corresponding to the calorimetric value and the input calorimetric value.

As described above, according to the seventh embodiment, the profile manager can check an estimation error about a specific calorimetric value and determine the validity of the existing profile.

<Eighth Embodiment>

The eighth embodiment of the present invention will be described below.

In general, when an image input/output apparatus exhibits large variations in color reproduction, an estimation error in a profile may increase due to the variations. In such a case, even if this profile is updated, the precision of the profile cannot be improved.

According to a characteristic feature of the eighth embodiment, color reproduction variation information in an image input/output apparatus is output in addition to the estimation error based on an existing profile. This allows a profile manager to refer to the variation information as well. Hence, the profile manager can determine the validity of the profile more properly.

Figure 24:
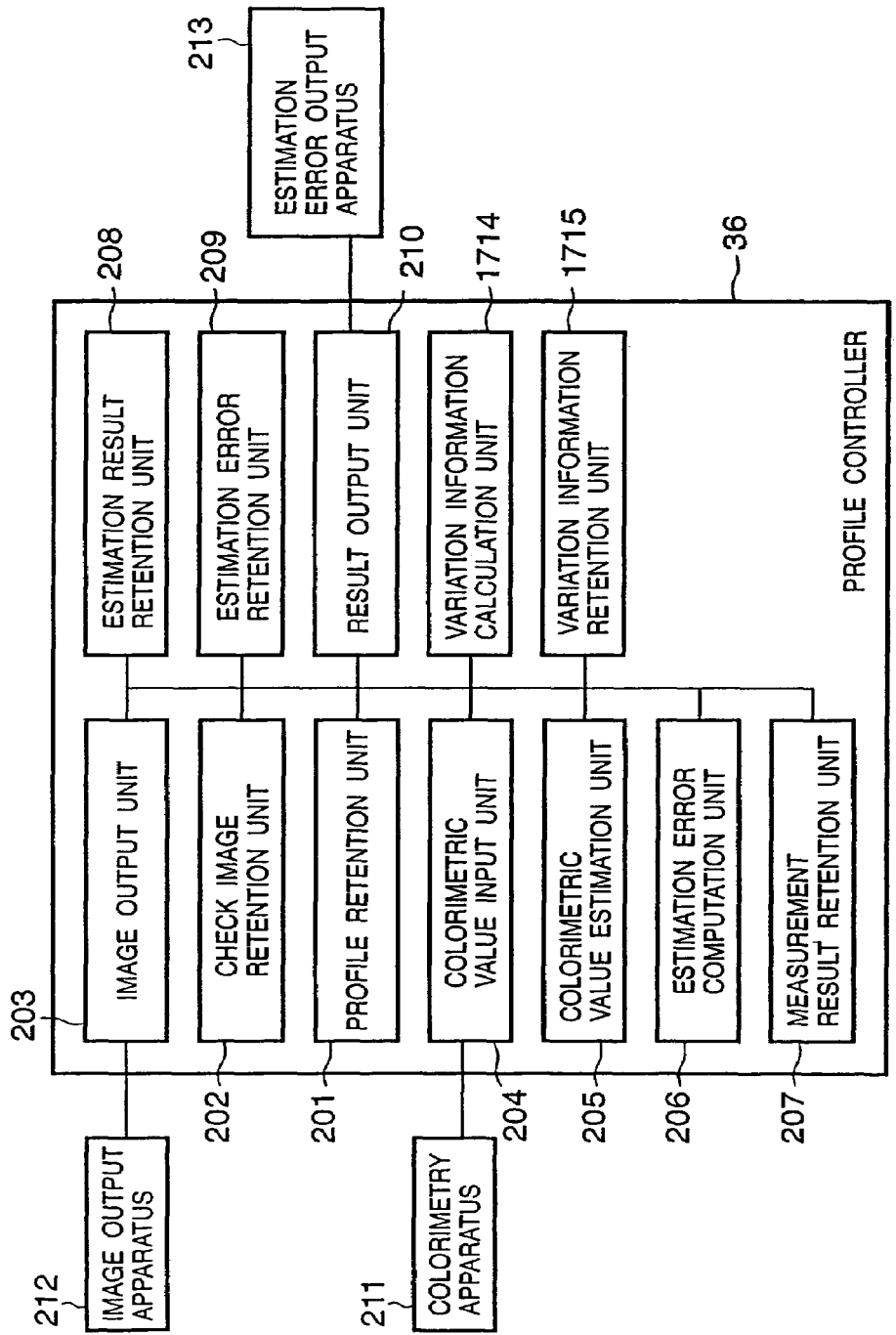
FIG. 24 is a block diagram showing the detailed arrangement of a profile controller in the eighth embodiment.

FIG. 24 shows the arrangement of a profile controller 36 in the eighth embodiment. Referring to FIG. 24, according to a characteristic feature of the eighth embodiment, this arrangement includes a variation information calculation unit 1714 and variation information retention unit 1715 in addition to the arrangement of the fourth embodiment shown in FIG. 9. The variation information calculation unit 1714 calculates color reproduction variation information in an output image from an image output apparatus 212, and stores it in the variation information retention unit 1715. This variation information is obtained by, for example, making an image output apparatus 212 to output a plurality of color image data having the same value and quantifying variations in calorimetric value in the plurality of output images. The same reference numerals as in FIG. 9 denote the same parts in FIG. 24, and a description thereof will be omitted.

A procedure for outputting calorimetric value estimation errors in the eight embodiment is the same as that in the fourth embodiment described above, and hence follows the flow chart of FIG. 10. According to a characteristic feature of this procedure, however, in the estimation error output processing in step S3306, the variation information stored in the variation information retention unit 1715 is also output to an estimation error output apparatus 213.

FIG. 25 shows an example of how estimation errors are displayed in the eighth embodiment. According to the display example shown in FIG. 25, sets of color names 1801, estimation errors 1802, and pieces of variation information 1803 are output in correspondence with the number of colors. That is, in addition to the data in the estimation error display example in the fifth embodiment (FIG. 13), the calorimetric value variations corresponding to the respective color names are output.

Figure 26:
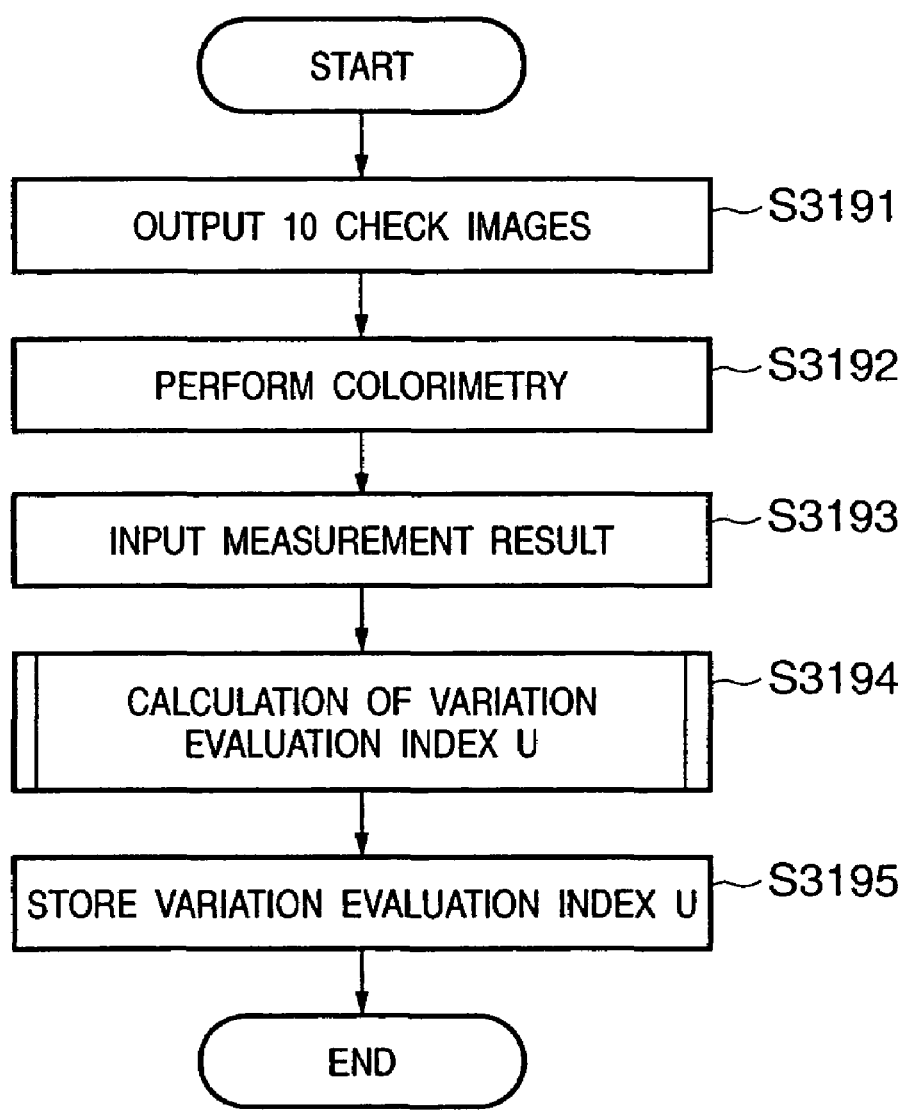
FIG. 26 is a flow chart showing variation information acquisition processing in the eighth embodiment.

FIG. 26 is a flow chart showing vibration information acquisition processing in the eighth embodiment.

First of all, the color image data stored in a check image retention unit 202 is output to the image output apparatus 212 through an image output unit 203 to print out images on, for example, 10 printing sheets (step S3191). The 10 output images are calorimetrically measured by a colorimetry apparatus 211 (step S3192). The colorimetry result is stored in a measurement result retention unit 207 through a calorimetric value input unit 204 (step S3193). The variation information calculation unit 1714 then calculates a variation estimation index U on the basis of the 10 calorimetric values stored in the measurement result retention unit 207 (step S3194). This variation estimation index U is stored in the variation information retention unit 1715.

As a method of calculating the variation estimation index U in step S3194, for example, the same method as the procedure shown in FIG. 3 in the first embodiment is used.

The sampling count for calculating the variation evaluation index U is not limited to 10.

As described above, according to the eighth embodiment, the profile manager can check the degrees of variations in the colors of an output image from an image output apparatus in addition to estimation errors about calorimetric values based on the existing profile. The profile manager therefore can properly determine the validity of the profile in consideration of variation information.

In the fourth to eighth embodiments described above, the CIE/L*a*b* color space is used as a device-independent color space. However, instead of this color space, the CIE/XYZ or CIE/L*u*v* color space or another color spaced based on these color space may be used.

In addition, an evaluation value (estimation error) of a profile is calculated by using the CIE1994 color difference formula. However, instead of using this formula, the CIE1976 color difference formula, CMC color difference formula, BFD color difference formula, BLAB color difference formula, or another evaluation value for quantifying the difference between a pair of color signals may be used.

<Ninth Embodiment>

The ninth embodiment of the present invention will be described below.

In the ninth embodiment, a method of creating a profile will be described in detail. In this case, an example of how a profile 35 for suppressing the influence of in-plane variations in an output image in an output apparatus 5, in particular, will be described below.

Figure 27:
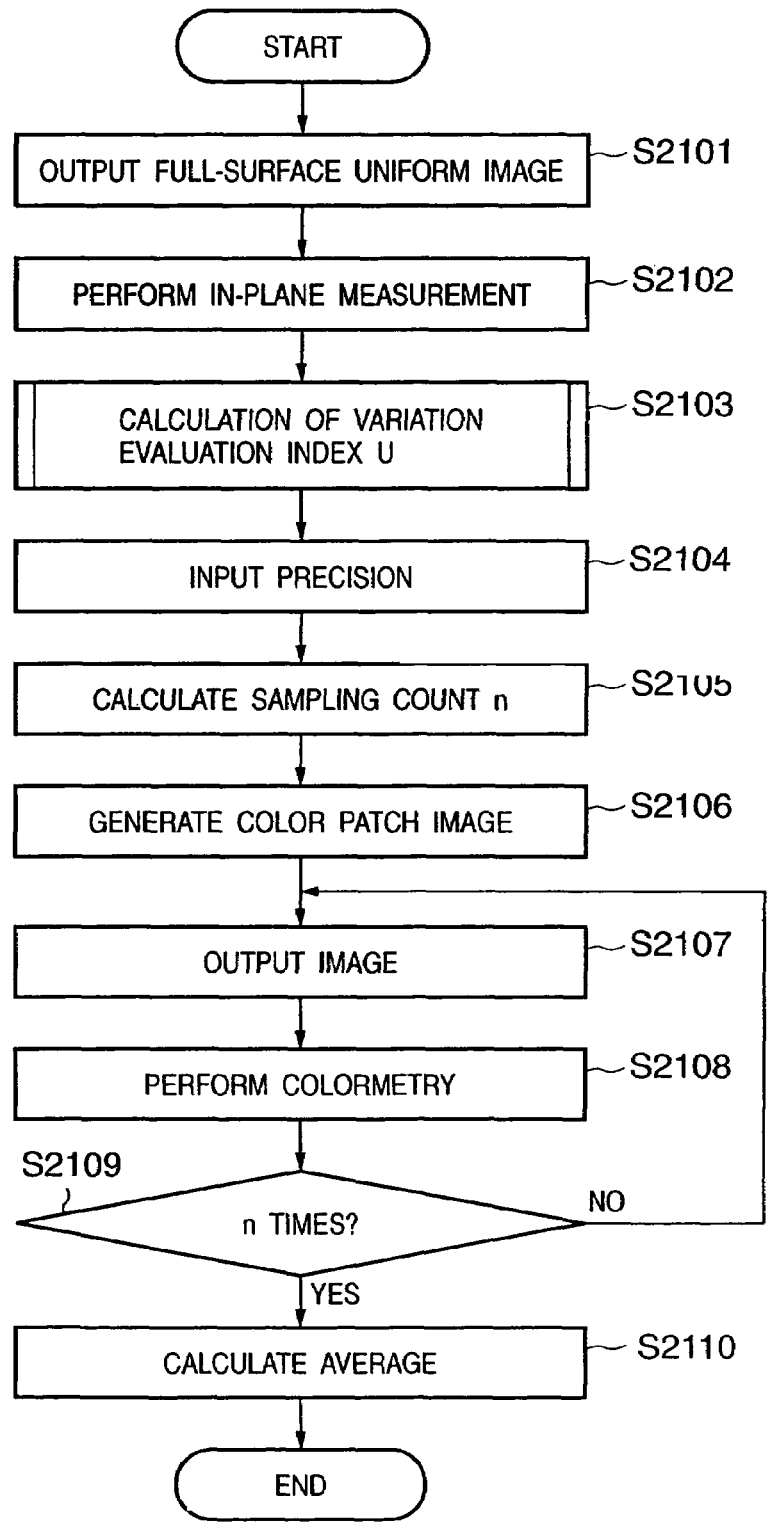
FIG. 27 is a flow chart showing a procedure for obtaining the relationship between a color signal and a device-independent color space in the ninth embodiment.

FIG. 27 is a flow chart showing a procedure for obtaining the relationship between a color signal and a device-independent color space to create a profile for a CMS in this embodiment.

In the output apparatus 5, an image whose entire surface is formed by uniform color signals (full-surface uniform image) is output (step S2101). Color variations are measured by performing colorimetry at a plurality of points in the output image (step S2102). A variation estimation index U is then calculated on the basis of the measurement values (step S2103). Note that the index U is calculated by the method shown in FIG. 3 in the first embodiment.

Assume that variations conform to a normal distribution, and $U^2$ is regarded as a population variance. In this case, letting n be the sampling count, a 99% confidence interval S for an average value is given by $$S = 2.58 U/\sqrt{n} \qquad (11)$$

A desired precision (confidence interval) S is input (step S2104). The sampling count n required to obtain an average value with this precision S is obtained by equation (12) (step S2105).

$$n = (2.58 U/S)^2 \qquad (12)$$

An image (color patch image) in which colors necessary for the creation of a profile are arranged is generated (step S2106). This image is then output to perform colorimetry (steps S2107 and S2108). The processing in steps S2107 to S2108 is repeated a total of n times (S2109).

For each color, the obtained n measurement values are averaged (step S2110), and the average value is set as a value in a device-independent color space which corresponds to a color signal. Note that instead of the average value of the n measurement values, the median of the measurement values may be effectively used as a value in the device-independent color space.

In this embodiment, on the basis of the correspondence between the color signals and values in the device-independent color space which are obtained by the procedure shown in FIG. 27, a profile can be created as a transformation formula or table for transforming the color signals and the values in a device-independent color space.

Figure 28:
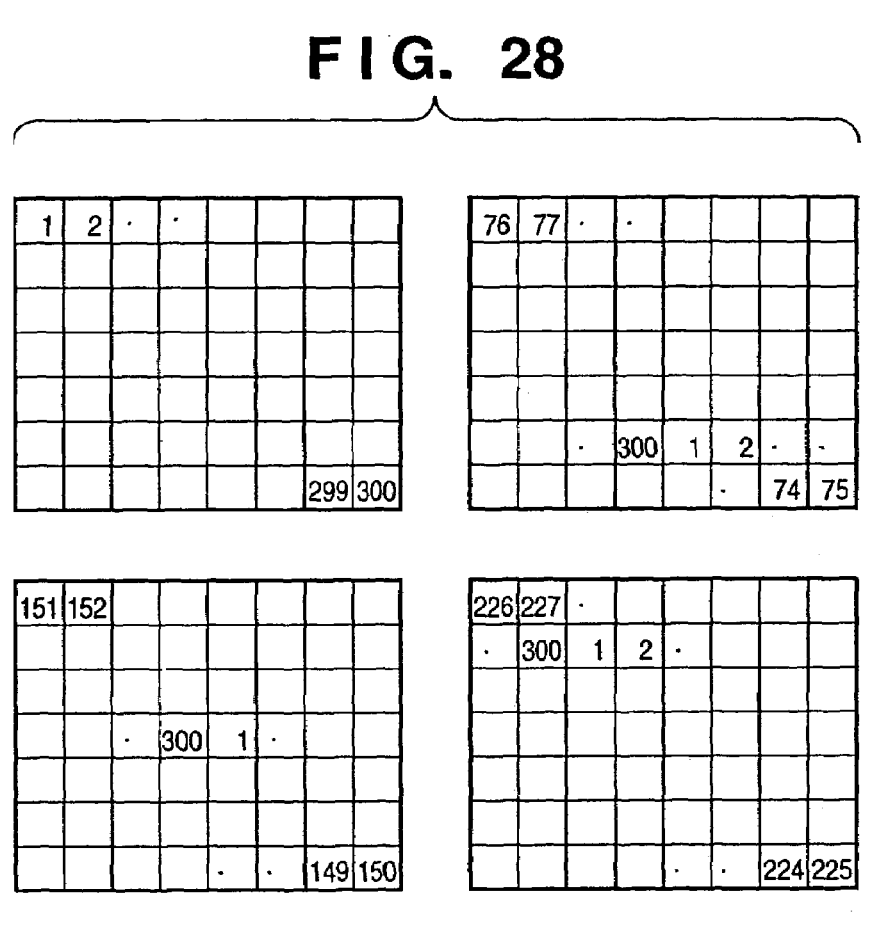

A color patch image generated in the ninth embodiment will be described below. FIG. 28 shows an example of the color arrangement of the color patch image generated in step S2106 in FIG. 27. In the ninth embodiment, patches of the same color are dispersed in a plane of an output image form the output apparatus 5 to average color reproduction characteristic variations within the plane.

In the case shown in FIG. 28, each number is a color number indicating a color type. More specifically, 300 colors (numbers 1 to 300 in FIG. 28) are arranged in one image, and four images obtained by shifting these colors are output. The four images are calorimetrically measured, and the respective colors are averaged. In the ninth embodiment, therefore, a profile for a CMS is created on the basis of combinations of the 300 color signals and the averages of the four corresponding measurement values.

As described above, according to the ninth embodiment, a profile for a CMS can be created in consideration of in-plane variations in an output image from the output apparatus 5. By executing the CMS, therefore, color reproduction can be implemented while the influence of the in-plane variations in the output apparatus 5 is suppressed.

As a consequence, even when the same color image is output to a plurality of image output apparatuses each serving as the output apparatus 5, a good image can be stably reproduced in each apparatus.

The ninth embodiment has exemplified the case wherein the values obtained by measuring identical colors in four images are averaged. Obviously, however, a similar effect can be obtained by arranging identical colors at a plurality of positions on one image. Although the ninth embodiment has exemplified the creation processing for the profile 35 associated with the output apparatus 5, the present invention can be applied to the input apparatus 1 as well. That is, in the ninth embodiment, the processing based on variations in calorimetric value in a sample image output from the output apparatus 5 has been described. However, by giving consideration to variations in signal value in a sample image input by the input apparatus 1 instead of the above variations, the profile 34 can be properly created in the input apparatus 1 in the same manner as described above. This technique is especially effective when the input apparatus 1 is a scanner for reading images.

<10th Embodiment>

The 10th embodiment according to the present invention will be described below. The arrangement of an image processing apparatus in the 10th embodiment is the same as that shown in FIG. 1 in the first embodiment described above, and hence a description thereof will be omitted.

In general, in an output apparatus 5, even identical color signals vary in calorimetric value depending on the image output timing. Even when, for example, identical color signals are to be output, if an immediately preceding output image has a high-lightness color or low-lightness color after, for example, full-surface white output or full-surface black output processing is performed, the corresponding colorimetric values may vary.

According to a characteristic feature of the 10th embodiment, a proper profile can be created while the influence of immediately preceding image output processing in the output apparatus 5 is suppressed.

Figure 29:
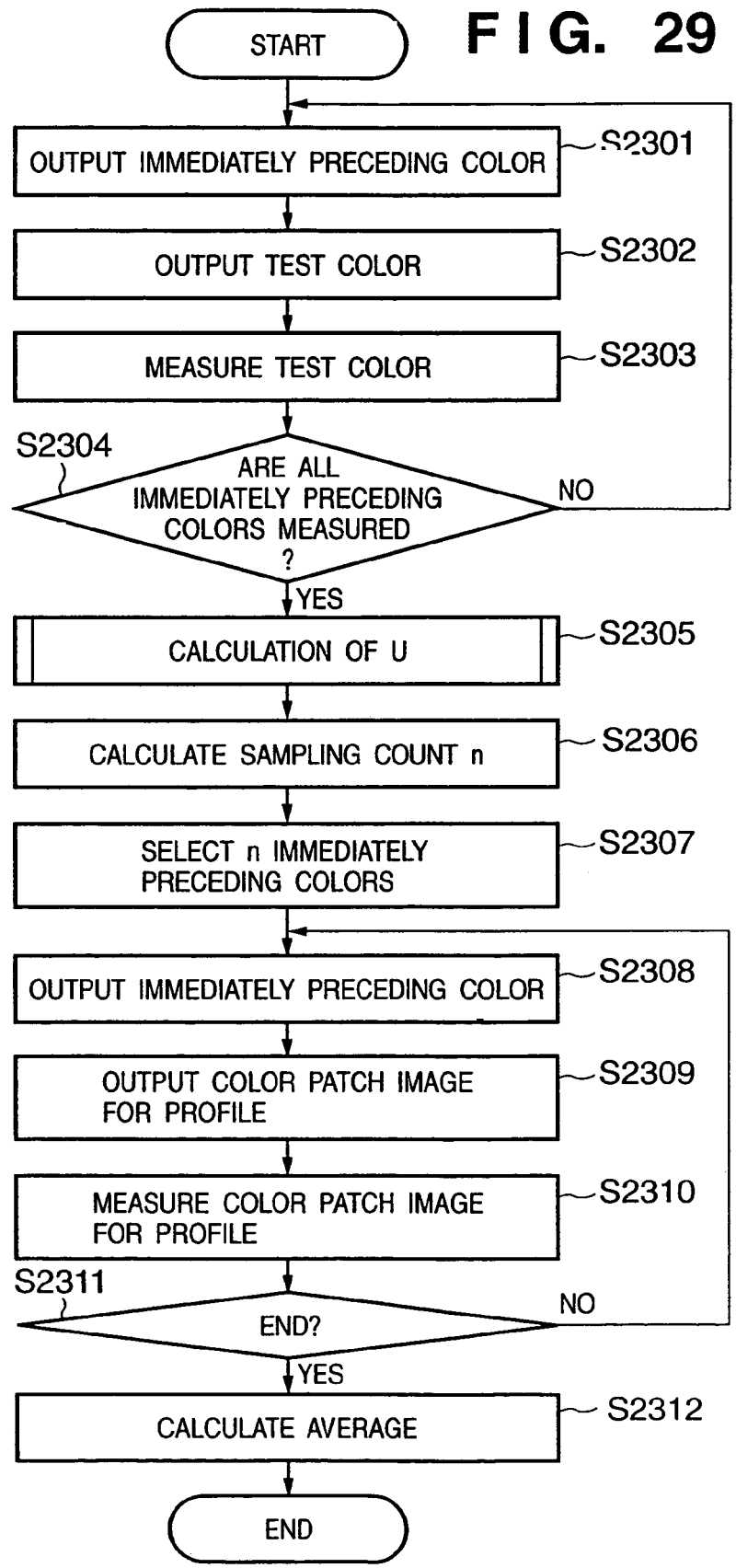
FIG. 29 is a flow chart showing a procedure for obtaining the relationship between a color signal and a device-independent color space in the 10th embodiment.

FIG. 29 is a flow chart showing a procedure for obtaining the relationship between color signals and an device-independent color space to create a profile for a CMS in the 10th embodiment. In the 10th embodiment, a set of color signals sampled at proper intervals as immediately preceding output colors from the output apparatus 5 will be referred to as an immediately preceding color group hereinafter.

An outline of the processing shown in FIG. 29 will be described. First of all, by checking how much a color (immediately preceding color) output from the output apparatus 5 immediately before the creation of a profile influences a colorimetric value used for the creation of a profile, a sampling count n for obtaining an average calorimetric value is obtained. For a test color required to create a profile, n sampled values obtained by colorimetry after n immediately preceding colors are output are averaged to obtain a colorimetric value with the influence of the immediately preceding colors being suppressed.

The flow chart of FIG. 29 will be described in detail below.

First of all, one of an immediately preceding color group constituted by a plurality of color signals sampled at proper intervals is output from the output apparatus 5 (step S2301). Subsequently, a full-surface uniform image formed by a specific color signal (test color) is output (step S2302), and calorimetrically measured (step S2303). The processing in steps S2301 to S2303 is repeated for all immediately preceding colors in the immediately preceding color group (step S2304). With this operation, calorimetric values corresponding to all the immediately preceding colors can be obtained.

Assume that an immediately preceding color group is constituted by only white and black signals. In this case, first of all, the output apparatus 5 outputs a white (225, 255, 255) image, and then outputs an image of a test color to perform colorimetry. Subsequently, the output apparatus 5 outputs a black (0, 0, 0) image, and then outputs an image of a test color to perform colorimetry.

Next, a variation evaluation index U is obtained on the basis of the colorimetric values of test colors, which are obtained for the respective immediately preceding colors, by the same procedure as that shown in FIG. 3 in the first embodiment (step S2305). A sampling count n required to obtain an average value with a desired precision S is obtained on the basis of equation (12) in the ninth embodiment (step S2306).

When the sampling count n is determined, n immediately preceding colors are selected by sampling color signals at equal intervals (step S2307). After the respective immediately preceding colors are output (step S2308), a color patch image required for the creation of a profile is output (step S2309). This image is then calorimetrically measured (step S2310). This processing in steps S2308 to S2310 is repeated for n immediately preceding colors (step S2311). With this operation, n colorimetric values of the respective color signals used for the creation of a profile can be obtained with respect to different immediately preceding colors.

The n calorimetric values obtained for each color in the color patch image are averaged (step S2312), and the average value is set as a color in the device-independent color space corresponding to the color signal.

In the 10th embodiment, on the basis of the correspondence between each color signal and a corresponding value in the device-independent color space, obtained by the procedure shown in FIG. 29, a profile can be created as a transformation formula or table for transforming the two values.

As described above, according to the 10th embodiment, a profile for a CMS can be created in consideration of the influence of an immediately preceding image output from the output apparatus 5. By executing the CMS on the basis of the profile, therefore, color reproduction can be implemented while the influence of an immediately preceding image output from the output apparatus 5 is suppressed.

Although the 10th embodiment has exemplified the creation of a profile with the influence of an immediately preceding image output from the output apparatus 5 being suppressed, the 10th embodiment may be so modified as to suppress the influence of each immediately preceding color in one output image in which a plurality of colors are arranged.

<11th Embodiment>

The 11th embodiment of the present invention will be described below. The arrangement of an image processing apparatus in the 11th embodiment is the same as that in the first embodiment in FIG. 1, a description thereof will be omitted.

According to a characteristic feature of the 11th embodiment, an average color difference is used in place of the variation evaluation index U in step S2103 in FIG. 27 in the ninth embodiment.

Figure 30:
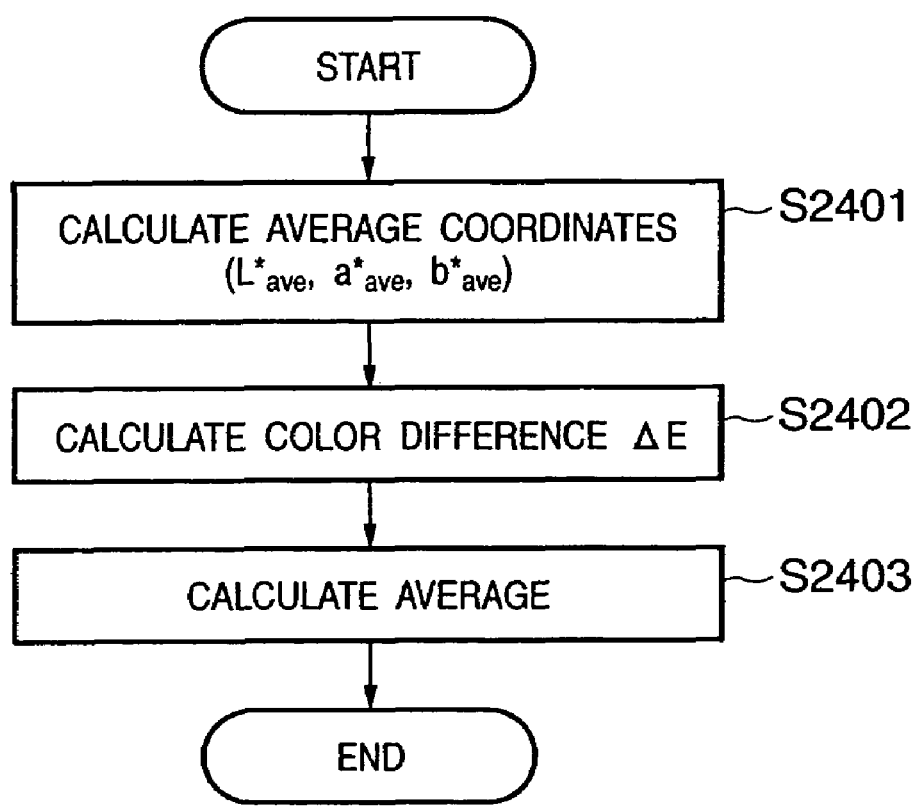
FIG. 30 is a flow chart showing a procedure for calculating an average color difference in the 11th embodiment.
Figure 31:
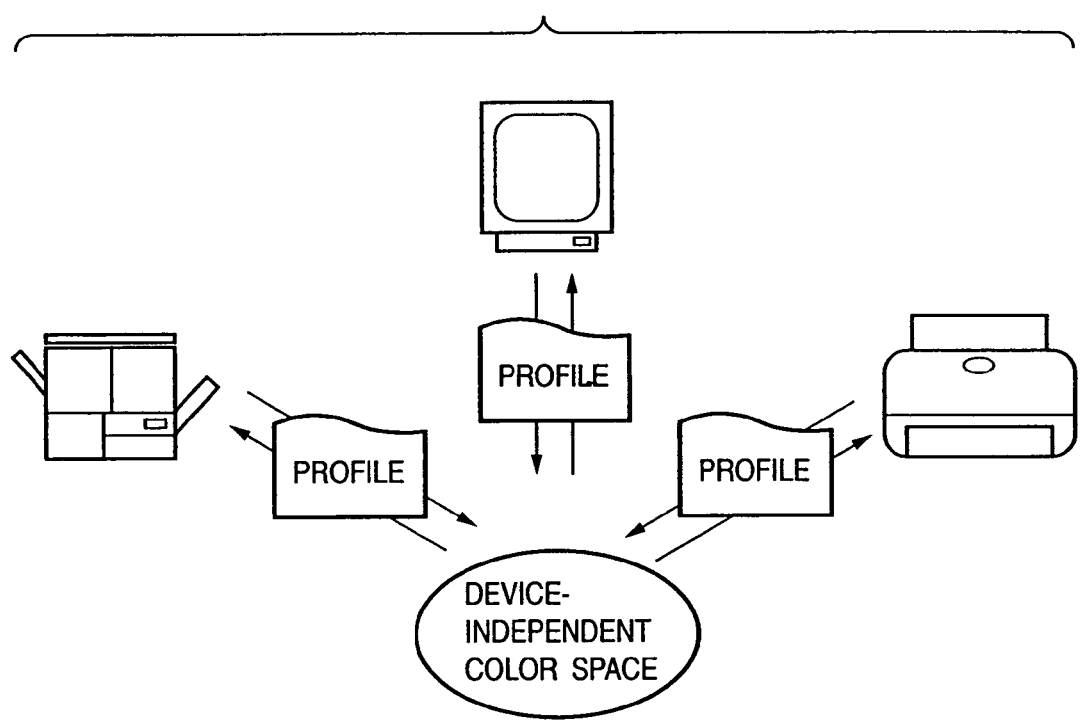
FIG. 31 is a view showing a concept of a general color management system.

FIG. 30 is a flow chart showing a procedure for calculating an average color difference in the 11th embodiment. First of all, average coordinates ($L^*_{ave}$, $a^*_{ave}$, $b^*_{ave}$) in the CIE/L*a*b* space are obtained on the basis of the calorimetric values of output images based on identical color signals according to equations (1) (step S2401).

A color difference ΔE between the average coordinates and each calorimetric value is calculated according to equation (13) given below (step S2402).

$$\Delta E = \sqrt{\{(L^*_{ave} - L^*)^2 + (a^*_{ave} - a^*)^2 + (b^*_{ave} - b^*)^2} \quad (13)$$

The color differences ΔE of the respective calorimetric values are averaged (step S2403), and the average value is used in place of the variation evaluation index U in the ninth embodiment.

As described above, according to the 11th embodiment, by using an average color difference in place of the variation evaluation index U as well, a proper profile for a CMS can be created in consideration of the influence of an immediately preceding image output from an output apparatus 5 as in the ninth embodiment, thus realizing proper color reproduction.

The CIE1976 color difference formula is used in step S2402 in the 11th embodiment. However, the present invention is not limited to this. Obviously, another color difference formula such as the CIE1994, CMC, BFD, or MLAB color difference formula can be used.

[Other Embodiment]

The present invention may be applied to a system constituted by a plurality of devices (e.g., a host computer, an interface device, a reader, a printer, and the like) or an apparatus comprising a single device (e.g., a copying machine, a facsimile apparatus, or the like).

The object of the present invention is realized even by supplying a storage medium storing software program codes for realizing the functions of the above-described embodiments to a system or apparatus, and causing the computer (or a CPU or an MPU) of the system or apparatus to read out and execute the program codes stored in the storage medium.

In this case, the program codes read out from the storage medium realize the functions of the above-described embodiments by themselves, and the storage medium storing the program codes constitutes the present invention.

As a storage medium for supplying the program codes, a floppy disk, a hard disk, an optical disk, a magnetooptical disk, a CD-ROM, a CD-R, a magnetic tape, a nonvolatile memory card, a ROM, or the like can be used. The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

As many apparently widely different embodiments of the present invention can be made without departing from the spirit and scope thereof, it is to be understood that the invention is not limited to the specific embodiments thereof except as defined in the appended claims.

What is claimed is:

1. A method of updating color transformation information for a device, comprising:
   a first acquisition step of acquiring measurement data representing a current color reproduction characteristic of the device;
   a second acquisition step of acquiring estimated data representing a color reproduction characteristic based on the color transformation information;
   a third acquisition step of acquiring a degree of stability of a color reproduction characteristic in the device;
   a determination step of determining, on the basis of the measurement data, the estimated data the estimated characteristic, and the degree of stability, whether to update the color transformation information; and
   an updating step of updating the color transformation information using measurement data of the device based on the result of said determination step.

2. The method according to claim 1, wherein in said determination step, it is determined whether updating the color transformation information, based on the degree of stability and a difference between the measurement data and the estimated data.

3. The method according to claim 1, wherein the degree of stability shows a variation degree of the measurement data.

4. The method according to claim 1, further comprising a notification step of notifying a user of the result of the determination step.

5. The method according to claim 1, wherein the degree of stability corresponds to additional information which is retained together with the color transformation information.

6. The method according to claim 5, wherein the additional information includes at least one of a sampling count by which a sample image is colorimetrically measured at the time of creation of the color transformation information, an average colorimetric value of the sample image, and a root sum square of color differences.

7. The method according to claim 5, wherein the additional information includes a degree of stability of the device at the time of creation of the color transformation information.

8. An image processing apparatus for updating color transformation information for a device, comprising:
   first acquisition means for acquiring measurement data representing a current color reproduction characteristic of the device;
   second acquisition means for acquiring estimated data representing a color reproduction characteristic based on the color transformation information;
   third acquisition means for acquiring a degree of stability of a color reproduction characteristic in the device;
   determination means for determining, on the basis of the current characteristic, the estimated characteristic, and the degree of stability, whether to update the color transformation information; and
   update means for updating the color transformation information on the basis of the determination result.

9. A computer program embodied in a computer readable medium for updating color transformation information for a connected device, comprising:
   code for a first acquisition step of acquiring measurement data representing a current color reproduction characteristic of the device;
   code for a second acquisition step of acquiring estimated data characteristic representing a color reproduction characteristic based on the color transformation information;
   code for a third acquisition step of acquiring a degree of stability of a color reproduction characteristic in the device;
   code for a determination step of determining, on the basis of the current characteristic, the estimated characteristic, and the degree of stability, whether to update the color transformation information; and
   code for an updating step of updating the color transformation information using measurement data of the device based on the result of said determination step.

10. A recording medium storing the program defined in claim 9.

11. A color processing method, comprising:
   a stability characteristic acquisition step of acquiring a stability characteristic showing a stability of color reproduction in an image output apparatus;
   a determination step of determining the number of generated patches of the same color based on the stability characteristic;
   a colorimetric value acquisition step of making the image output apparatus generate a color patch image in response to the number determined in the determination step to acquire colorimetric values of the generated color patch image; and
   a production step of producing color transformation information which is relevant to the image output apparatus.

12. The color processing method according to claim 11, wherein the stability characteristic is a variation degree of the colorimetric values at plural positions in the color patch image generated by the image output apparatus based on a uniform color signal.

13. The method according to claim 12, wherein the variation degree is calculated based on standard variations for each of lightness, chroma and hue of the colorimetric values at the plural positions.

14. The method according to claim 12, wherein the variation degree is calculated based on a difference between an average value of the colorimetric values at the plural positions and a colorimetric value of each patch image.

15. The method according to claim 11, further comprising a input step of inputting information of a desired precision, wherein, in the determination step, the number of generated patches of the same color is determined based on the stability characteristic and the precision.

16. A computer program embodied in a computer readable medium for causing a computer to perform color processing method, comprising:
   code for a stability characteristic acquisition step of acquiring a stability characteristic showing a stability of color reproduction in an image output apparatus;
   code for a determination step of determining the number of generated patches of the same color based on the stability characteristic;
   code for a colorimetric value acquisition step of making the image output apparatus generate a color patch image in response to the number determined in the determination step to acquire colorimetric values of the generated color patch image; and
   code for a production step of producing color transformation information which is relevant to the image output apparatus.

17. An image processing apparatus comprising:
   stability characteristic acquisition means for acquiring a stability characteristic showing a stability of color reproduction in an image output apparatus;
   determination means for determining the number of generated patches of the same color based on the stability characteristic;
   colorimetric value acquisition means for making the image output apparatus generate a color patch image in response to the number determined in the determination step to acquire colorimetric values of the generated color patch image; and
   production means for producing color transformation information which is relevant to the image output apparatus.

18. A color processing method, comprising:
   an acquisition step of acquiring colorimetric values of plural images output by an output device;
   a first calculation step of calculating an evaluation characteristic showing a variation of the colorimetric values;
   a second calculation step of calculating estimated colorimetric values of the plural images using color transformation information of the output device; and
   a determination step of determining whether to update the color transformation information using the evaluation characteristic and a difference between the acquired colorimetric values and the estimated colorimetric values.

19. The method according to claim 18, further comprising an updating step of updating the color transformation information using the acquired colorimetric values when it is determined, in the determination step, that the color transformation information should be updated.

20. A computer program embodied in a computer readable medium for causing a computer to perform a color processing method, comprising:
   code for an acquisition step of acquiring colorimetric values of plural images output by an output device;
   code for a first calculation step of calculating an evaluation characteristic showing a variation of the colorimetric values;
   code for a second calculation step of calculating estimated colorimetric values of the plural images using color transformation information of the output device; and
   code for a determination step of determining whether to update the color transformation information using the evaluation characteristic and a difference between the acquired colorimetric values and the estimated colorimetric values.

21. An image processing apparatus comprising:
   acquisition means for acquiring colorimetric values of plural images output by an output device;
   first calculation means for calculating an evaluation characteristic showing a variation of the colorimetric values;
   second calculation means for calculating estimated colorimetric values of the plural images using color transformation information of the output device; and
   determination means for determining whether to update the color transformation information using the evaluation characteristic and a difference between the acquired colorimetric values and the estimated colorimetric values.

22. A color processing method, comprising:
a first acquisition step of acquiring color transformation information of an output device and an evaluation characteristic showing a variation of plural images, the evaluation characteristic being calculated when the color transformation information is generated;
a second acquisition step of acquiring colorimetric values of plural images output by the output device;
a calculation step of calculating estimated colorimetric values of the plural images using the transformation information;
a determination step of determining whether to update the color transformation information using the evaluation characteristic and a difference between the acquired colorimetric values and the estimated colorimetric values.

23. The method according to claim 22, further comprising an updating step of updating the color transformation information using the acquired colorimetric values when it is determined, in the determination step, that the color transformation information should be updated.

24. A computer program embodied in a computer readable medium for causing a computer to perform a color processing method, comprising:
code for a first acquisition step of acquiring color transformation information of an output device and an evaluation characteristic showing a variation of plural images, the evaluation characteristic being calculated when the color transformation information is generated;
code for a second acquisition step of acquiring colorimetric values of plural images output by the output device;
code for a calculation step of calculating estimated colorimetric values of the plural images using the transformation information; and
code for a determination step of determining whether to update the color transformation information using the evaluation characteristic and a difference between the acquired colorimetric values and the estimated colorimetric values.

25. An image processing apparatus comprising:
first acquisition means for acquiring color transformation information of an output device and an evaluation characteristic showing a variation of plural images, the evaluation characteristic being calculated when the color transformation information is generated;
second acquisition means for acquiring colorimetric values of plural images output by the output device;
calculation means for calculating estimated colorimetric values of the plural images using the transformation information; and
determination means for determining whether to update the color transformation information using the evaluation characteristic and a difference between the acquired colorimetric values and the estimated colorimetric values.

26. A color processing method, comprising:
a first acquisition step of acquiring colorimetric values of plural images output by an output device;
a first calculation step of calculating a first evaluation characteristic showing a variation of the colorimetric values;
a second acquisition step of acquiring a second evaluation characteristic showing a variation of the colorimetric values of the plural images, the second evaluation characteristic being calculated when the color transformation information of the output device is generated; and
a determination step of determining whether to update the color transformation information using the first and second evaluation characteristics.

27. The method according to claim 26, further comprising an updating step of updating the color transformation information using the acquired colorimetric values when it is determined, in the determination step, that the color transformation information should be updated.

28. A computer program embodied in a computer readable medium for causing a computer to perform color processing method, comprising:
code for a first acquisition step of acquiring colorimetric values of plural images output by an output device;
code for a first calculation step of calculating a first evaluation characteristic showing a variation of the colorimetric values;
code for a second acquisition step of acquiring a second evaluation characteristic showing a variation of the colorimetric values of the plural images, the second evaluation characteristic being calculated when the color transformation information of the output device is generated; and
code for a determination step of determining whether to update the color transformation information using the first and second evaluation characteristics.

29. An image processing apparatus comprising:
first acquisition means for acquiring colorimetric values of plural images output by an output device;
first calculation means for calculating a first evaluation characteristic showing a variation of the colorimetric values;
second acquisition means for acquiring a second evaluation characteristic showing a variation of the colorimetric values of the plural images, the second evaluation characteristic being calculated when the color transformation information of the output device is generated; and
determination means for determining whether to update the color transformation information using the first and second evaluation characteristics.

* * * * *

UNITED STATES PATENT AND TRADEMARK OFFICE
CERTIFICATE OF CORRECTION

PATENT NO. : 7,003,151 B2  Page 1 of 1
APPLICATION NO. : 09/906644
DATED : February 21, 2006
INVENTOR(S) : Takuya Shimada It is certified that error appears in the above-identified patent and that said Letters Patent is hereby corrected as shown below:

On the Title Page, Item [57] ABSTRACT

Line 13, "the" (3rd occurrence) should be deleted.

COLUMN 19

Line 55, "an" should read --a--.

COLUMN 21

Line 38, "Embodiment]" should read --Embodiments]--.

COLUMN 22

Line 22, "data the estimated" should read --data,--;
    Line 23, "characteristic," should be deleted; and
    Line 29, "whether updating" should read --whether to update--.

COLUMN 23

Line 8, "characteristic" should be deleted; and
    Line 51, "a" should read --an--.

Signed and Sealed this

Fifteenth Day of August, 2006

JON W. DUDAS
*Director of the United States Patent and Trademark Office*